United States Patent
Herman et al.

(10) Patent No.: US 12,448,209 B2
(45) Date of Patent: Oct. 21, 2025

(54) HIGH-DENSITY AUTOMATED STORAGE AND RETRIEVAL SYSTEM

(71) Applicant: CARNEGIE MELLON UNIVERSITY, Pittsburgh, PA (US)

(72) Inventors: Herman Herman, Pittsburgh, PA (US); Gabriel Goldman, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 44 days.

(21) Appl. No.: 18/508,371

(22) Filed: Nov. 14, 2023

(65) Prior Publication Data

US 2024/0101347 A1  Mar. 28, 2024

Related U.S. Application Data

(63) Continuation of application No. 17/610,211, filed as application No. PCT/US2020/033790 on May 20, 2020, now Pat. No. 12,091,244.

(60) Provisional application No. 62/850,191, filed on May 20, 2019.

(51) Int. Cl.
*B65G 1/04* (2006.01)
*B65D 21/02* (2006.01)

(52) U.S. Cl.
CPC ....... *B65G 1/0435* (2013.01); *B65D 21/0204* (2013.01); *B65G 1/0478* (2013.01)

(58) Field of Classification Search
CPC ...... B65G 37/02; B65G 35/08; B65G 1/1378; B65G 1/0478
See application file for complete search history.

(56) References Cited

U.S. PATENT DOCUMENTS

| 2,864,515 A | | 12/1958 | Marshall |
| 3,508,495 A | | 4/1970 | Mirel |
| 3,662,905 A | * | 5/1972 | Mizuno ............... E04H 6/24 |
| | | | 104/163 |

(Continued)

FOREIGN PATENT DOCUMENTS

| DE | 3920405 C1 | 3/1990 |
| EP | 1614643 A1 | 1/2006 |

(Continued)

OTHER PUBLICATIONS

European Patent Office Action issued in EP Application No. 20808276. 8, dated Aug. 23, 2024, 12 pages.

(Continued)

*Primary Examiner* — Kaitlin S Joerger

(74) *Attorney, Agent, or Firm* — KDW FIRM PLLC

(57) ABSTRACT

A high-density storage system for goods is described in which totes carrying the goods are storage in a storage structure and stored and retrieved by robotic carriers. The carriers move laterally and/or longitudinally along the exterior of the support structure and retrieve totes from the interior of the structure by manipulating rows of coupled totes. Totes at the ends of rows are quickly removed and stored in another row until the desired tote appears at the end of the row, at which point the carrier proceeds with the tote to the exit point of the storage system. Storing totes is also a quick action by pushing them into any row. As a tote is pushed into the row, it will automatically couple with a tote inside the row that it comes into contact with.

11 Claims, 38 Drawing Sheets

(56) References Cited

U.S. PATENT DOCUMENTS

| | | | |
|---|---|---|---|
| 3,805,973 | A | 4/1974 | Thompson |
| 3,927,773 | A | 12/1975 | Bright |
| 4,389,157 | A | 6/1983 | Bernard |
| 4,679,381 | A | 7/1987 | Truninger |
| 5,012,917 | A * | 5/1991 | Gilbert .................. B62D 65/18 198/465.1 |
| 5,179,265 | A | 1/1993 | Sheridan |
| 5,707,199 | A | 1/1998 | Faller |
| 6,170,634 | B1 | 1/2001 | Jaquet |
| 9,511,830 | B2 | 12/2016 | Corcoran |
| 9,639,824 | B1 | 5/2017 | Brazeau |
| 10,196,208 | B1 | 2/2019 | Kalm |
| 10,322,878 | B2 | 6/2019 | Mahadevan |
| 10,737,881 | B2 | 8/2020 | Mahadevan |
| 10,759,601 | B2 | 9/2020 | Valinsky |
| 10,781,043 | B1 | 9/2020 | Kalm |
| 10,793,355 | B1 | 10/2020 | Garcia |
| 10,807,798 | B1 | 10/2020 | Kalm |
| 10,894,674 | B2 | 1/2021 | Wagner |
| 10,913,603 | B1 | 2/2021 | Kalm |
| 11,119,487 | B2 | 9/2021 | Jarvis |
| 11,332,312 | B2 | 5/2022 | Valinsky |
| 11,358,793 | B2 | 6/2022 | Garcia |
| 2003/0131464 | A1* | 7/2003 | Yagaki .................. B23Q 7/06 29/429 |
| 2003/0185656 | A1 | 10/2003 | Hansl |
| 2005/0186053 | A1 | 8/2005 | Itoh |
| 2009/0028675 | A1 | 1/2009 | Tsujimoto |
| 2010/0230408 | A1 | 9/2010 | Licari |
| 2010/0300842 | A1 | 12/2010 | Bastian, II |
| 2011/0318145 | A1* | 12/2011 | De Vries .................. B65G 1/06 414/277 |
| 2013/0129455 | A1 | 5/2013 | De Vries |
| 2014/0044506 | A1 | 2/2014 | De Vries |
| 2015/0259141 | A1 | 9/2015 | Yamada |
| 2016/0132059 | A1 | 5/2016 | Mason |
| 2016/0347544 | A1 | 12/2016 | Kvifte |
| 2017/0225890 | A1* | 8/2017 | Li ........................... B65G 1/06 |
| 2018/0029796 | A1 | 2/2018 | De Vries |
| 2018/0290830 | A1 | 10/2018 | Valinsky |
| 2018/0339858 | A1 | 11/2018 | Iwata |
| 2019/0023491 | A1 | 1/2019 | Mahadevan |
| 2019/0375590 | A1 | 12/2019 | Gravelle |
| 2020/0231419 | A1 | 7/2020 | Kalm |
| 2021/0009348 | A1 | 1/2021 | Pietrowicz |
| 2021/0061577 | A1* | 3/2021 | Okazaki .............. B23Q 7/1447 |
| 2021/0130092 | A1* | 5/2021 | Hu .......................... B65G 1/10 |
| 2021/0198039 | A1 | 7/2021 | Salichs |
| 2021/0284444 | A1 | 9/2021 | Ranjith Kumar |
| 2021/0339897 | A1 | 11/2021 | Almogy |
| 2021/0387808 | A1 | 12/2021 | Kalouche |
| 2022/0009731 | A1 | 1/2022 | Haid |
| 2022/0119210 | A1 | 4/2022 | Felton |
| 2022/0219899 | A1 | 7/2022 | Herman |
| 2022/0348427 | A1 | 11/2022 | Bell |
| 2023/0348184 | A1* | 11/2023 | Hiratani .................. B60P 1/435 |

FOREIGN PATENT DOCUMENTS

| | | |
|---|---|---|
| ES | 2069491 A2 | 5/1995 |
| FR | 3051948 A1 | 12/2017 |
| IT | 1189761 B | 2/1988 |
| JP | S58100003 A | 6/1983 |
| JP | S5978305 U | 5/1984 |
| JP | S63122551 U | 8/1988 |
| JP | H03125707 U | 12/1991 |
| JP | H0442104 U | 4/1992 |
| JP | 2003063612 A | 3/2003 |
| JP | 2017536314 A | 12/2017 |
| WO | 2018068026 A1 | 4/2018 |
| WO | 2019093473 A1 | 5/2019 |
| WO | 2021038437 A1 | 3/2021 |
| WO | 2021236164 A1 | 11/2021 |

OTHER PUBLICATIONS

European Search Report and Written Opinion for Application No. EP20808276, mailed Mar. 27, 2023, 9 pages.

Extended European Search Report for European Patent Application 20936541.0, mailed Apr. 24, 2024, 7 pages.

International Search Report and Written Opinion for International Patent Application No. PCT/US2020/033790, mailed on Aug. 14, 2020, 13 pages.

International Search Report and Written Opinion for International Patent Application No. PCT/US2020/067174, mailed Mar. 8, 2021, 8 pages.

The International Search Report and Written Opinion mailed Jan. 22, 2024 for corresponding PCT/US23/28687 (11 pages).

The International Search Report and Written Opinion mailed Feb. 2, 2024 for corresponding PCT/US23/80095 (15 pages).

The International Search Report and Written Opinion mailed Feb. 6, 2024 for corresponding PCT/US23/80091 (seven (7) pages).

The International Search Report and Written Opinion mailed Mar. 1, 2024 for corresponding PCT/US23/80082 (15 pages).

* cited by examiner

HIGH-DENSITY AUTOMATED STORAGE AND RETRIEVAL SYSTEM

RELATED APPLICATIONS

This application is a continuation of U.S. patent application Ser. No. 17/610,211, filed Nov. 10, 2021, which is a national phase filing under 35 U.S.C. § 371 claiming the benefit of and priority to International Patent Application No. PCT/US2020/033790, filed May 20, 2020, which claims the benefit of U.S. Provisional Patent Application No. 62/850,191, filed May 20, 2019. The contents of these applications are incorporated herein in their entireties.

BACKGROUND

Companies are pushing to maximize the storage density and efficiency of automated storage and retrieval systems (AS/RS) in their order fulfillment process. AS/RS systems use automated carriers that typically move either between or on top of structures that hold products or totes filled with products. In the case of systems (Schaefer iCube, Cuby, and Miliload Crane, Dematic Multishuttle, Venderlande ADAPTO, and OPEX Perfect Pick) where carriers move in between aisles of products and/or totes, there is a limit as to how dense the system can be in that the space required for the carrier movement reduces the overall potential storage density of the system.

Some systems (Autostore, and CimCorp) maximize density by stacking products or totes vertically, which maximizes storage density, but has potentially lower efficiency when retrieving products or totes that are buried lower in the stacks. In the case of the CimCorp system, a gantry services a range of totes that are stacked on the floor, which assists to minimize infrastructure but ultimately has a limit on performance based on a limited number of gantry arms overlapping the same workspace. The Autostore system stacks totes vertically within a raised structure. Retrieval robots have to lift the totes from the top one-by-one. This results in a limit on performance to retrieve totes that are lower in the stack with each lift taking a longer amount of time proportional to the height of the tote stack or product being lifted.

SUMMARY OF THE INVENTION

The embodiments described herein provide the capability for a highly dense storage solution while also providing a high level of performance, thereby improving both density and speed of retrieval over prior art systems. Instead of stacking the totes vertically (which has an inherent height limit due to the mechanical limit and the weight of the totes), the totes are arranged in horizontal rows within a supporting structure. Unlike other systems, the totes are mechanically coupled to allow for a row of horizontally connected totes to be pulled and/or push together as a unit by pulling or pushing the tote on the end of a row, which will also pull or push all other totes within that same row that are connected to each other. This arrangement allows any totes within a row to be retrieved by repeatedly pulling and decoupling the outer tote or totes from the row until the right tote is retrieved. It also allows for the easy storage of totes. A tote could be stored in this AS/RS system simply by pushing a tote into a row that has an empty spot. As that tote is pushed into that row, it will automatically couple itself longitudinally when it comes into contact with the totes that are already in that row. This efficient storage approach could also be used to store the outer totes that were removed from a row to access the tote that needs to be retrieved.

The described embodiments store totes within a layered support structure. This structure supports the weight of all totes as well as providing rows within the structure in which totes can be stored. The totes are placed into the structure rows through a horizontal motion in a similar manner to other rack-based storage solutions. The novel storage structure allows for a high number of totes to be stored in a single row, whereas more standard rack structures allow for only a small number of totes or packages to be stored on a given shelf, because there is no efficient way to access totes that are located deep in the row. The described embodiments are able to retrieve totes from anywhere within a row upon request with a high level of performance in comparison to other high-density storage solutions. This is possible since all totes, no matter how deep they are located in the row, could be accessed just by pulling on the outside totes until the totes of interest are at the edge of the row. Pulling on the outer tote or totes will also pull all the other totes that are coupled, allowing the tote that needs to be retrieved to be pulled outside of the row.

One embodiment of the invention retrieves totes within the system when they are pulled or pushed to the end of a row, where the tote is decoupled when moved in a direction other than the direction of the longitudinal axis of the row. In preferred embodiments, the tote is automatically decoupled when moved in a direction perpendicular to the longitudinal axis of the row. This exposes the next tote in the row to be pulled or pushed and decoupled. This process can then be repeated until the target tote to be retrieved is pulled or pushed to the end of the row and decoupled. The totes that were removed and decoupled from the row previous to access the target tote can be moved to another row one or more at a time. Those totes can then be coupled onto totes that were previously in the new row as they are push/pulled into the row.

The novel tote coupling embodiment also provides a method for totes to be coupled to one another through linear motion in the coupling direction. As totes are pushed into one another, features on the totes couple to one another to allow for transfer of forces between the totes along the length of the row. In one embodiment, coupling can only be accomplished in the direction of the row, whereas decoupling can only occur in any direction other than a direction along the longitudinal axis of the row. In other embodiments, active coupling and decoupling mechanisms may be provided.

There are multiple embodiments of how totes can be stored within the support structure. One embodiment has totes arranged in rows that are single tote height and coupled together along the length of the row. Other embodiments have totes arranged in stacks that are two or more totes high with one or more of the totes in the stack being coupled to the next tote stack in the row. For this embodiment, it is possible that neighboring stacks of totes in a row have different number of totes in their stack, resulting in one or more totes being coupled to the next tote stack in the row.

There are multiple embodiments for the novel technology wherein one or more automated carriers can access the totes in the support structure. One embodiment of the novel technology has one or more automated robotic carriers that moves in the center of multiple rows (on the left and right) of totes. It can pull or push totes from a row on either side to either retrieve it for delivery or push it into another row on either side until the target tote is retrieved.

Another embodiment for the novel technology features one or more carriers that travel along the outside of one or more faces of the storage structure along the ends of the tote rows. In this embodiment, automated carriers can push or pull totes from a row, decouple them from that row, and move it to another row or retrieve the tote from a single side of the carrier. Having the carrier on the outsides face(s) of the structure allow for a high density of storage space while still allowing for access to the automated carrier components from outside of the storage structure for maintenance or other operations.

A further embodiment of the novel system has carriers working in two or more pairs on opposite sides of the structure, with both automated carriers of each pair aligned on opposite ends of the same rows, or capable of storing and retrieving totes from the same or nearby rows. This embodiment utilizes both automated carriers to push and/or pull totes from both ends of the rows. The automated carriers would be able to move totes from one row to another in unison with one another until the tote(s) that need to be retrieved are removed from the storage structure row and decoupled from neighboring totes in the row, providing a "circular" motion of the totes within the rows.

This novel process is capable of having higher performance than other solutions for multiple reasons. First, by having totes within a row coupled to one another, the automated carriers only have to act on the totes on the end or near the end of the row, to move all of the coupled totes within that row. Secondly, by having totes that can decouple through motions in direction different from the direction of the longitudinal axis of the row, the process is able to be efficient and quick, reducing storage and retrieval times. Finally, as totes are moved to decouple from one row, they can be coupled to a new row in the same motion. Once the tote is coupled to the new row, it can be pushed or pulled resulting in the movement of the entire row.

DEFINITIONS

As used herein, the term "carrier" refers to a locally or remotely controlled robotic or mechanism capable of moving about a tote support and storage structure in a vertical, horizontal or both directions and capable of accepting, carrying and discharging one or more totes.

As used herein, a "tote" refers to a device capable of carrying goods for transport by a carrier from one location to another. The tote may be configured to be manipulated by a carrier for purposes of movement from a storage location to and from an exit or entry point of the storage system. The tote may be configured as a container or as a flat structure on which other containers may be placed.

As used herein, the term "storage structure" refers to a structure for storing totes and facilitating the placement and retrieval of totes within the storage structure by a carrier.

As used herein, a "row" is defined as a portion of a storage structure capable of storing a plurality of totes aligned longitudinally with each other and able to move in the longitudinal direction of the row. A row may be horizontal, vertical, or any orientation within the storage structure, but horizontal orientation is the preferred embodiment, because the force to pull a row of totes in the horizontal direction is significantly less than the force needed to lift the coupled totes in vertical direction.

DETAILED DESCRIPTION

The embodiments described herein utilize multiple carriers that work in unison to manipulate totes or other stored product from a storage structure, to efficiently retrieve a particular tote or store a tote. The process utilizes a system of totes or carriers that allow for force to be shared between a row of totes in a singular linear direction (in either positive or negative direction) but also allows for the totes to be decoupled mechanically by using electromechanical actuator, or by moving them in a direction other than the direction of the longitudinal axis of the row (either positive or negative direction). The novel technology can manipulate the totes or other products in both directions to move a target tote (and as a result, all totes coupled to the target tote) toward an end of the row where it may be decoupled from the row.

Figure 1A:
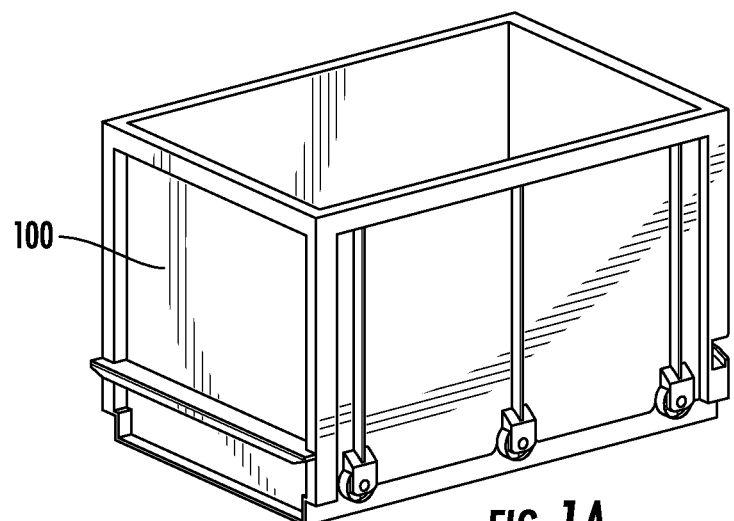
FIGS. 1A-1C show several views of a first embodiment of a tote where the tote comprises an integral carrier.
Figure 3A:
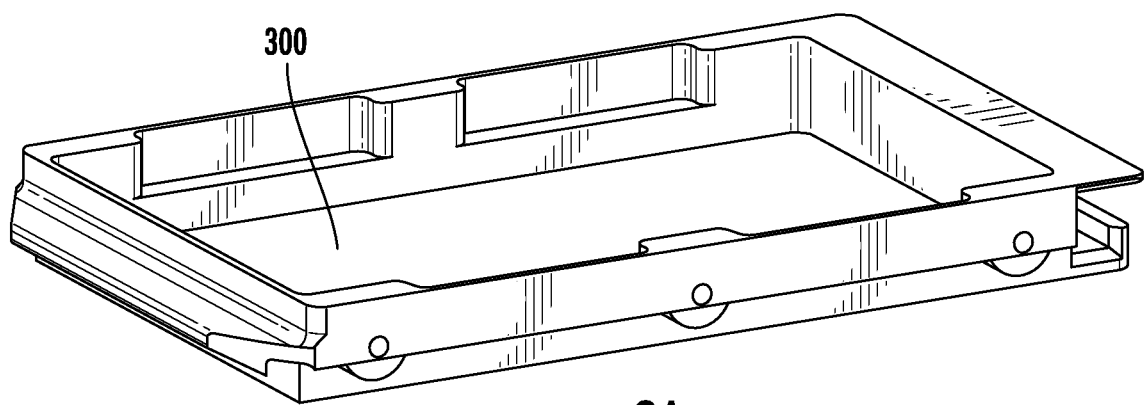
FIGS. 3A-3B show several views of a second embodiment of a tote where the tote comprises a flat carrier upon which containers or boxes containing goods may be stacked.
Figure 3B:
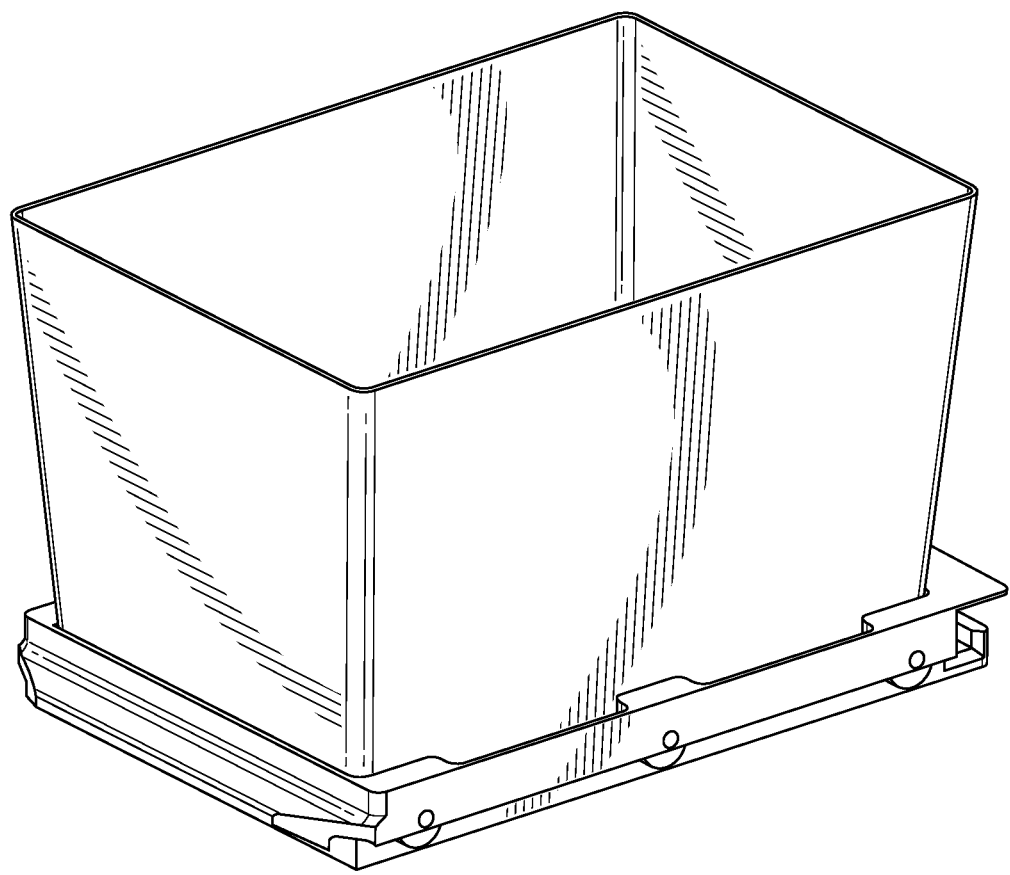

Tote Configuration—One aspect of the invention is directed to various configurations of totes for storage in a storage structure. A first embodiment of the tote is shown in FIG. 1A wherein the tote embodies a container structure 100 for accepting goods for storage. In an alternate embodiment of the invention, the tote may be configured as shown in FIG. 3A as a flat platform having the coupling and mobility components and which can accept goods or containers for goods stacked thereon, as shown in FIG. 3B.

Figure 1B:
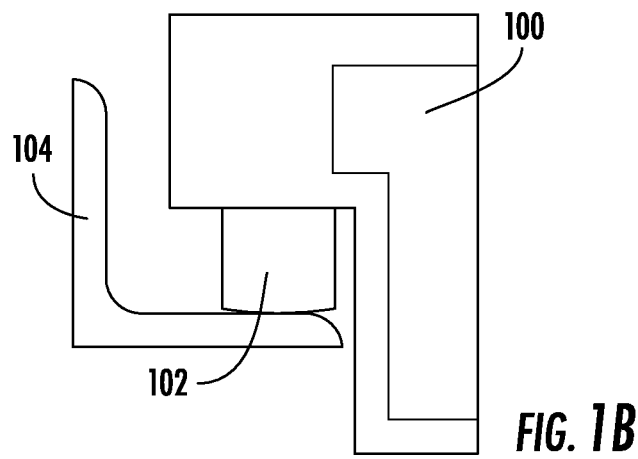
Figure 1C:
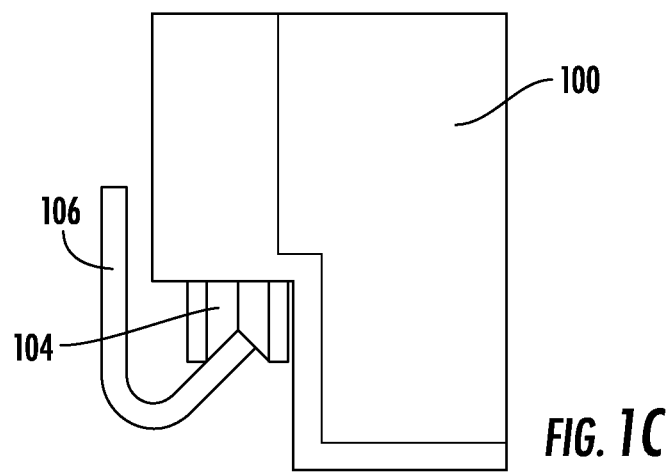

The totes are required to be able to be moved back and forth in a direction along the longitudinal axis of any row in the storage structure such that they may be manipulated as rows of totes within the storage structure. In one embodiment, shown in FIG. 1B, tote 100 may be configured with wheels or casters 102 which slide along rails 104 disposed in the storage structure. In an alternate embodiment, tote 100 may be configured with angled wheels 104 which slide along rails 106 as shown in FIG. 1C. In yet other embodiments, not shown in the figures, tote 100 may be configured with low friction sliding surfaces which engage mating surfaces in the storage structure. The mobility components of the embodiments shown in FIGS. 1B-1C may be fitted to the types of totes shown in FIG. 1A or FIG. 3A.

A second aspect of the invention is directed to a coupling system which allows totes to be coupled end-to-end as they are pushed into each other, thereafter allowing an entire row of coupled totes to be pushed or pulled from the tote on the end of the row.

Figure 2A:
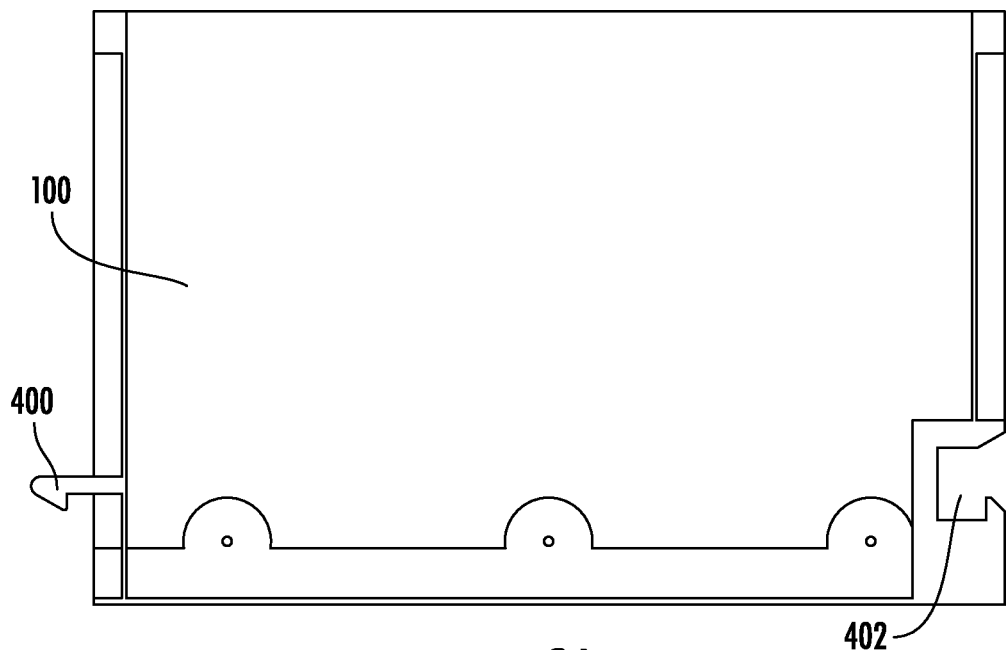
FIGS. 2A-2B show and inside views of the tote of FIGS. 1A-1C, showing the coupling mechanism.
Figure 2B:
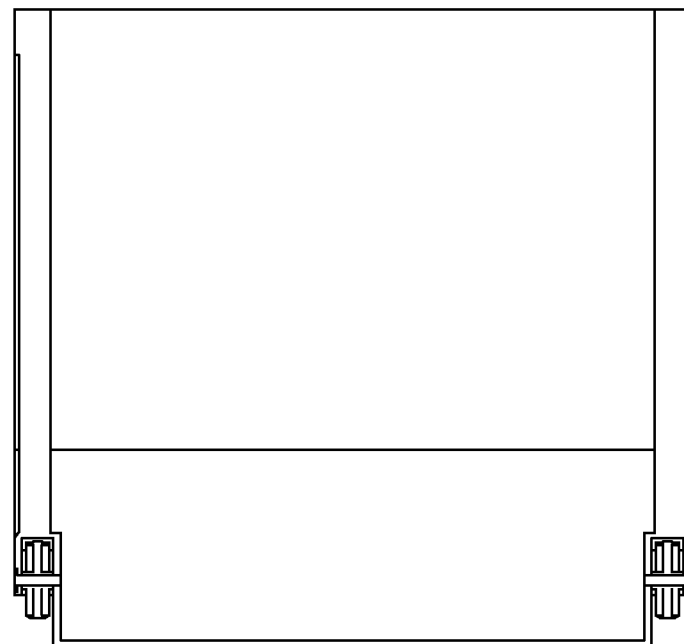
Figure 4A:
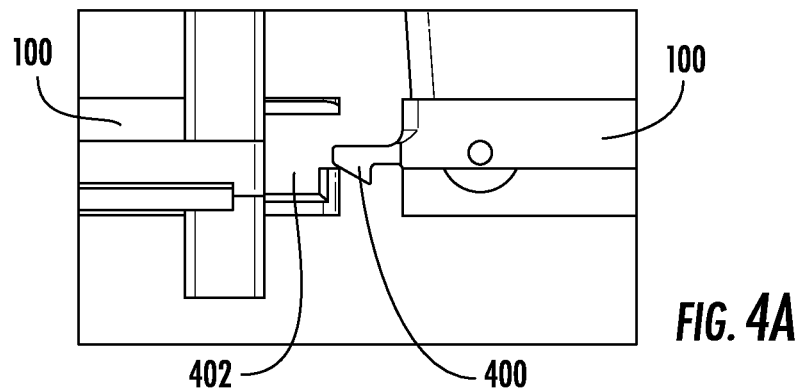
FIGS. 4A-4D show the passive end-to-end coupling process for totes.
Figure 4B:
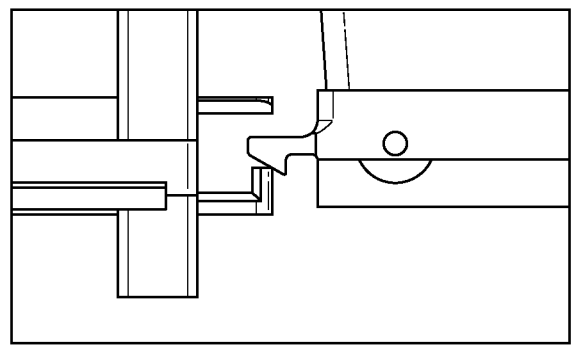
Figure 4C:
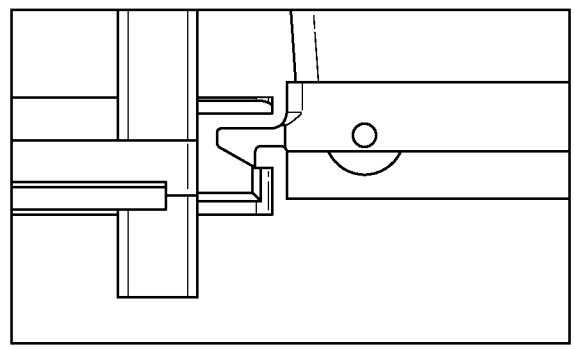
Figure 4D:
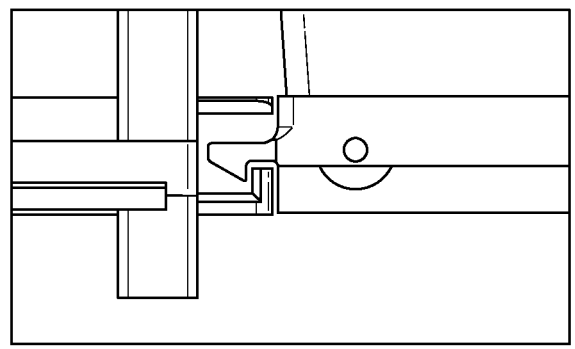

One embodiment of this aspect of the invention is shown in FIG. 2A, showing a side view of tote 100 in which one side on the end of the tote is configured with a hook, while the opposite side is configured with a hook receptacle for accepting the hook of an adjacent tote. FIGS. 4A-4D show one embodiment of the coupling process, in which the totes 100 are pushed together and wherein hook 400 on a first tote, having a slanted surface, is pushed upwardly by the lip of the hook receptacle 402 on the adjacent tote. In the embodiment shown in FIG. 4C, entire tote is raised to allow hook 400 to slide into hook receptacle 402. In an alternate embodiment, hook 402 may be spring-loaded such as to be able to be raised for disposal into the hook receptacle 402 without raising the entire tote 100. FIG. 4D shows tote 100 in a fully coupled position. Other embodiments of the coupling mechanism are contemplated to be within the scope of the invention.

The de-coupling of the totes may occur in one of two ways. In a first embodiment, the totes are decoupled as they are moved in a direction other than the direction of the longitudinal axis of the row, allowing hook 400 to slide out of the side of hook receptacle 402. As shown in FIG. 1A and FIG. 2A, hook receptacle 402 is open on the ends such as to allow hook 400 to slide out of hook receptacle 402 in response to a perpendicular motion of the totes with respect to each other.

Figure 5A:
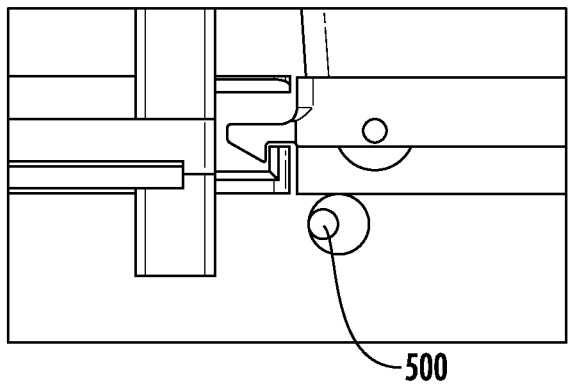
FIGS. 5A-5D show several views of one embodiment of an active decoupling process utilizing an eccentric roller.
Figure 5B:
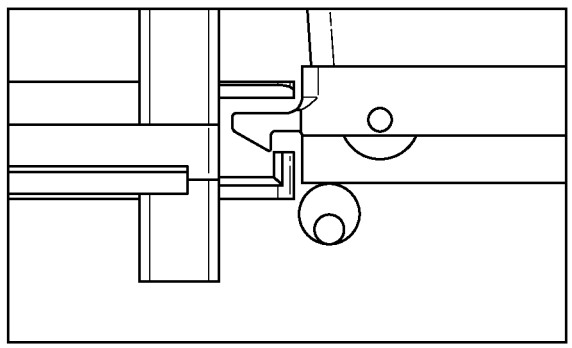
Figure 5C:
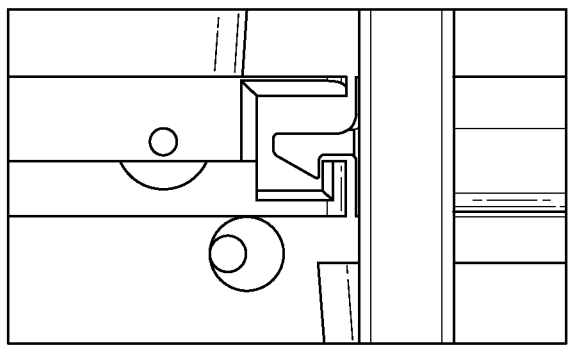
Figure 5D:
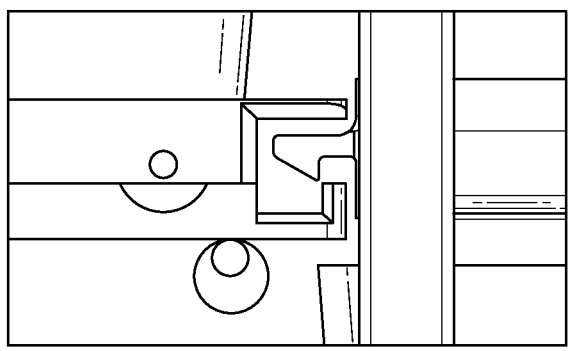

In a second embodiment of the invention, the totes may be decoupled either by an active or passive mechanism. FIGS. 5A-5D show an example of an active decoupling mechanism in which an eccentric roller is provided to lift tote 100, and thereby lift hook 400 out of hook receptacle 402. Note that when eccentric roller 500 is on the tote 100 having the hook 400, as shown in FIG. 5B, tote 100 must be raised to decouple the totes, while if eccentric roller 500 is on the tote 100 having the hook receptacle 402, as shown in FIG. 5D, tote 100 must be lowered to decouple the totes. FIG. 5C shows eccentric roller 500 in neutral position to allow for passive coupling of the totes. Other decoupling mechanisms are contemplated to be within the scope of the invention.

Figure 6A:
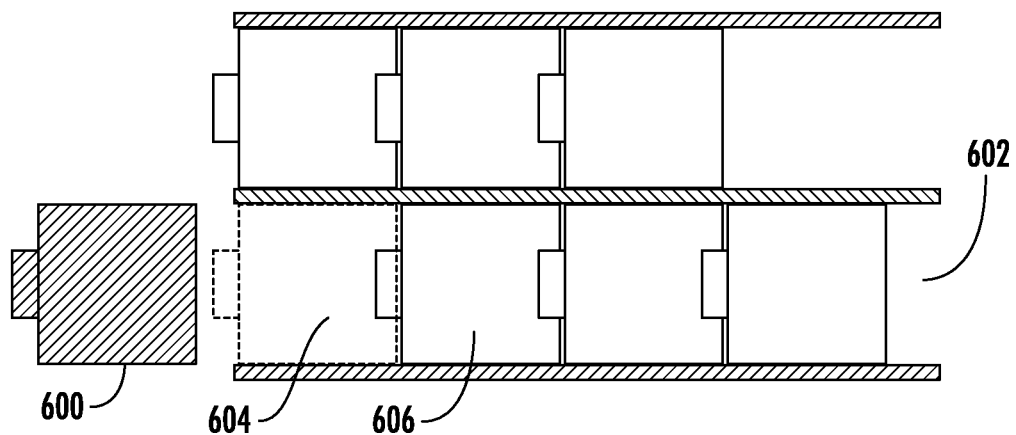
FIGS. 6A-6C show totes being coupled by longitudinal motion by being pushed onto a row.
Figure 6B:
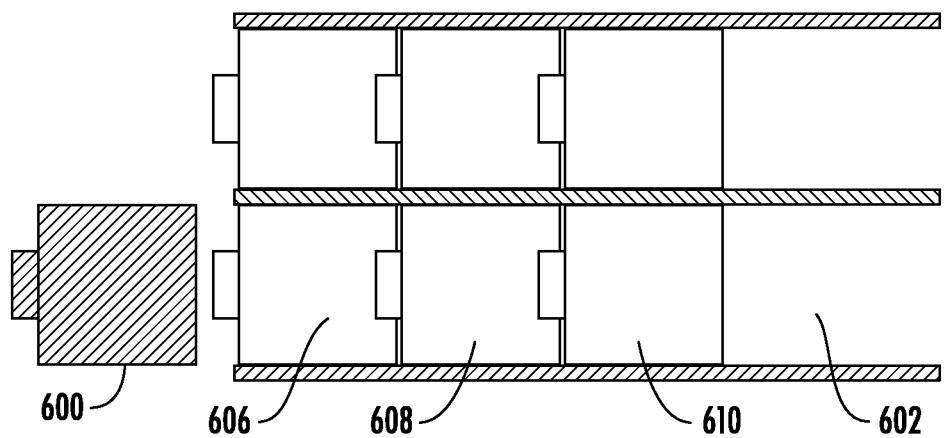
Figure 6C:
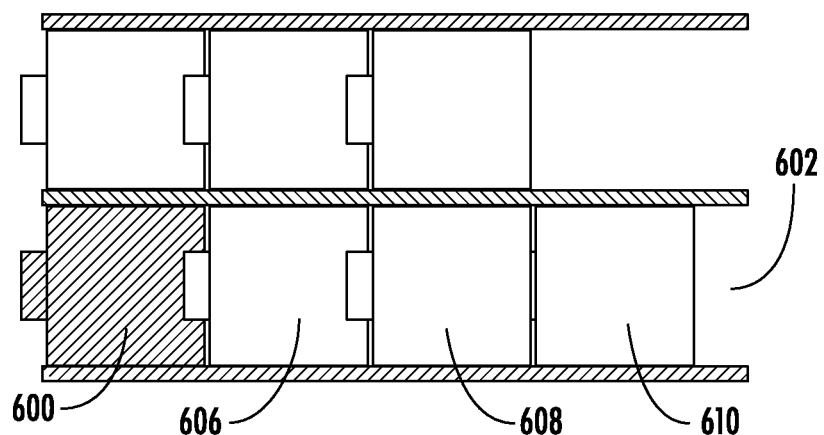

FIGS. 6A-6C show how totes are coupled as they are inserted into rows of the storage structure. FIG. 6A shows the situation wherein a gap 604 is present at the end of the row into which tote 600 is being pushed. When tote 600 is pushed into row 602, it will couple with tote 606, filling empty spot 604, however, none of the totes 606, 608, 610, in row 602 will be pushed in the longitudinal direction. FIG. 6B shows the situation wherein tote 606 is present at the end of row 602. In this case, when tote 600 is pushed into row 602, it will immediately couple with tote 606 and will cause totes 606, 608, 610 to be pushed into row 602 as tote 606 is pushed into row 602. In both cases, the end result is shown in FIG. 6C in which totes 600, 606, 608, 610 are present in row 602. Thereafter, as shown in FIG. 6C, if tote 600 is pulled, it would also pull on totes 606, 608 and 610 that are coupled to it in row 602. Likewise, pushing on the tote 600 would move the entire row of connected totes in the opposite longitudinal direction.

As the totes are coupled at the end of the row, and then inserted into a particular row, the coupled totes could fill in a gap within that row. If the tote farthest into the row crosses this gap and encounters another tote that is already in the row, the pushing motion by the carrier will cause them to couple and they will now move as a coupled unit.

Figure 7A:
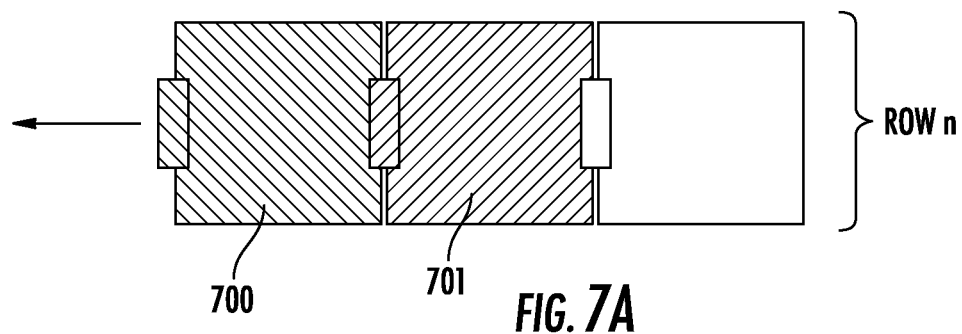
FIGS. 7A-7C show totes being decoupled by moving in a direction perpendicular to the row and re-coupled to an adjacent row based on the perpendicular motion.
Figure 7B:
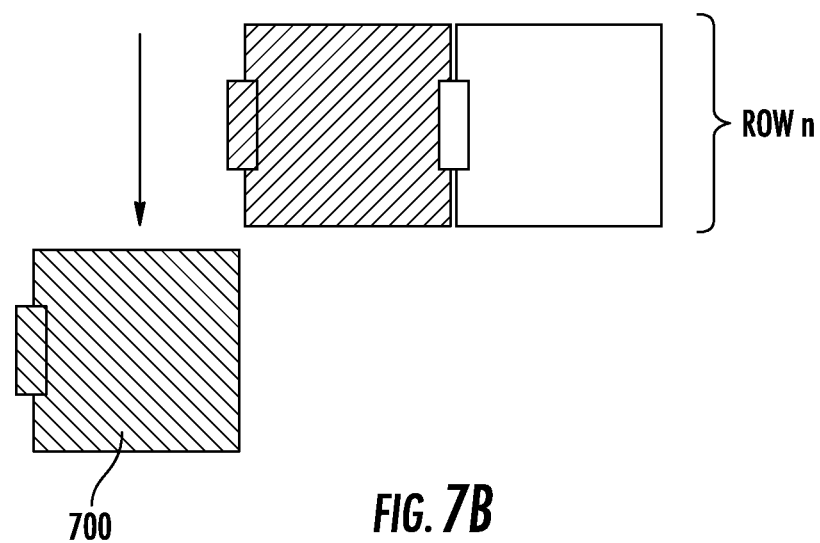
Figure 7C:
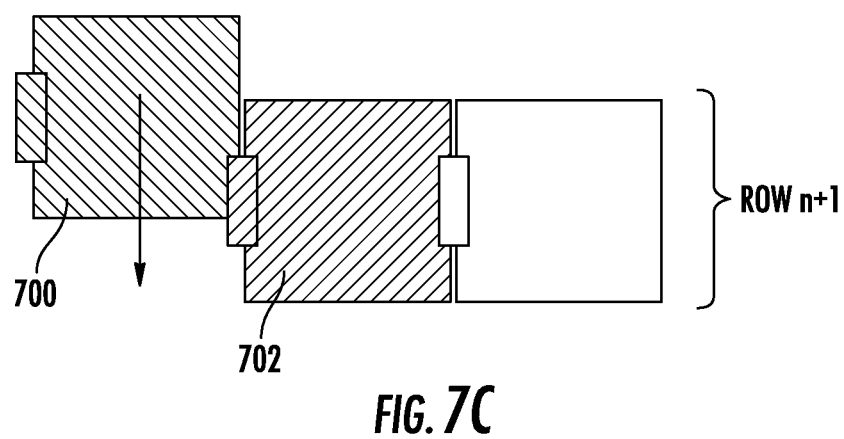

FIGS. 7A-7C show the motion required for passive decoupling of the totes. FIG. 7A shows tote 700 currently at the end of row n. Row n is pulled in the direction of the arrow by a carrier (not shown) to bring tote 700 onto the carrier. FIG. 7B shows the shifting of tote 700 in a direction perpendicular to the row by the carrier, which causes a passive decoupling of tote 700 from tote 701 in row n. As shown in FIG. 7C, Tote 700 is immediately passively coupled, as a result of the perpendicular motion, to adjacent tote 702 in row n+1. In alternate embodiments, if, for example, tote 702 were not at the end of row n+1, tote 700 could simply be pushed into row n+1 and would couple with the first tote at the end of the row by virtue of its longitudinal motion within the row. In yet another embodiment, after tote 700 has been decoupled from row n as shown in FIG. 7B, it may be removed by a carrier to an exit point of the system.

Figure 8A:
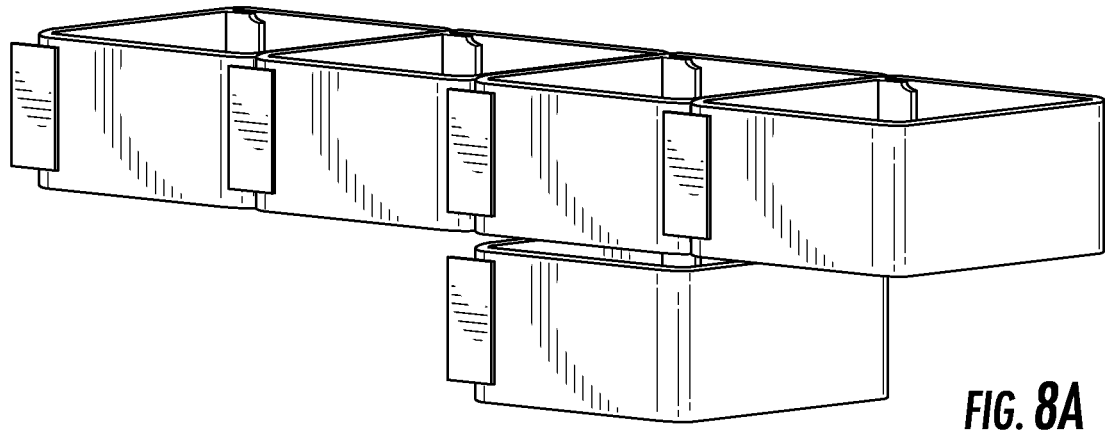
FIGS. 8A-8C show a tote coupling/decoupling in a vertical perpendicular direction.
Figure 8B:
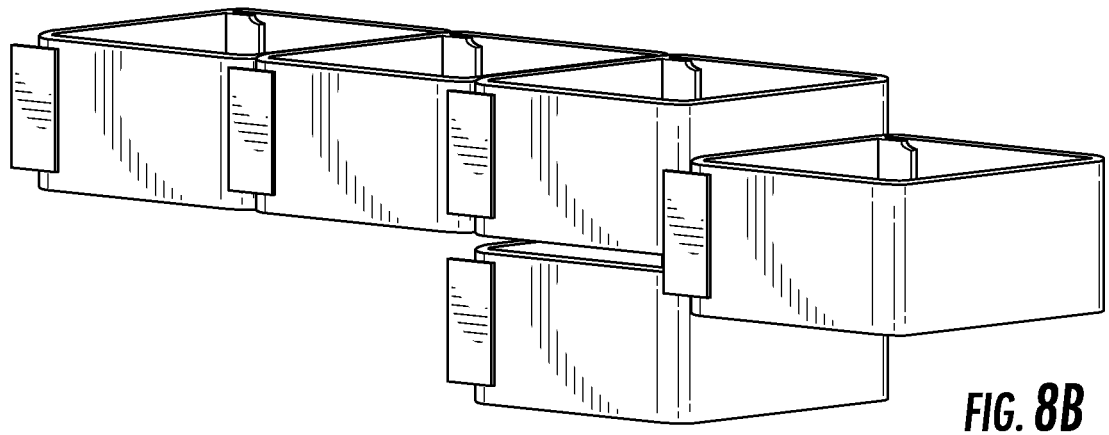
Figure 8C:
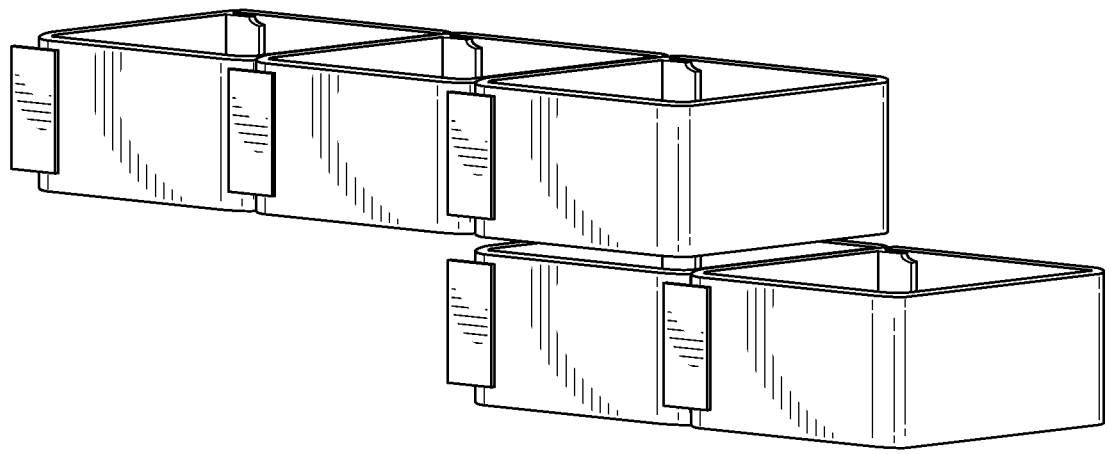
Figure 9:
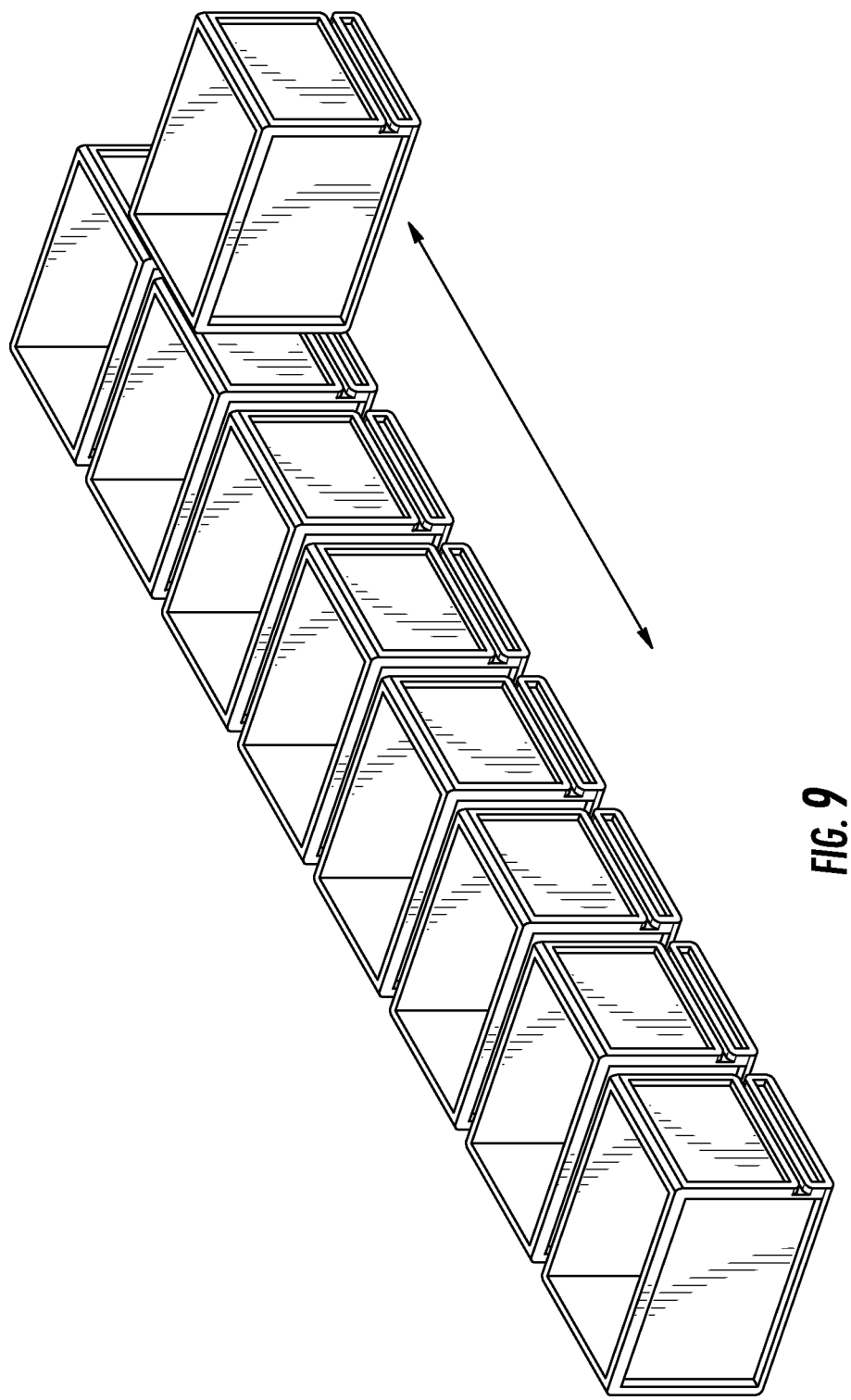
FIG. 9 shows a tote being coupled/decoupled in a horizontal perpendicular direction.

Totes can be coupled such that they can be decoupled in any direction other than longitudinal axis of the row (e.g., vertically, horizontally, diagonally). FIGS. 8A-8C show a distinct embodiment where totes can be decoupled/coupled in a vertical perpendicular direction, while FIG. 9 shows an alternative embodiment wherein totes can be decoupled/coupled in a horizontal perpendicular direction. Totes could also be decoupled by disabling the coupling mechanism using an electromechanical actuator.

Figure 10A:
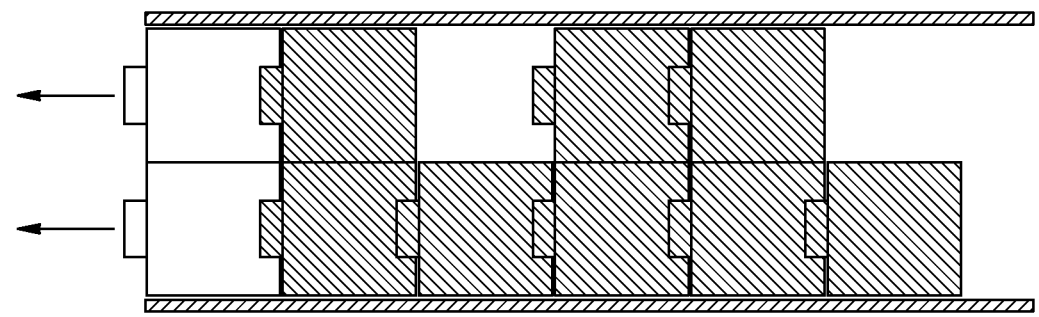
FIGS. 10A-10C show the coupling and decoupling of tote stacks stored within a row.
Figure 10B:
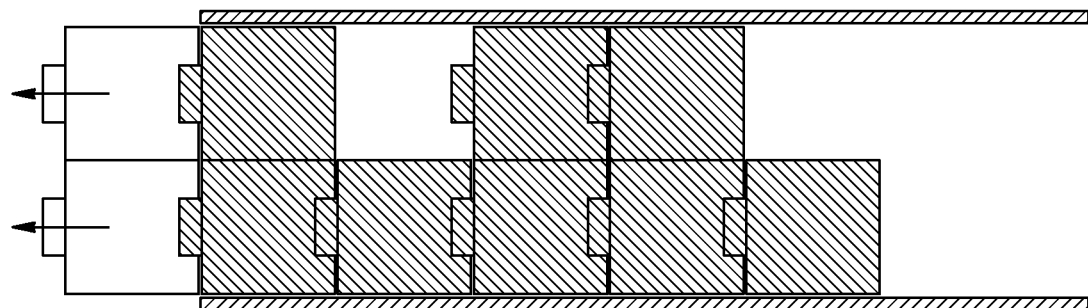
Figure 10C:
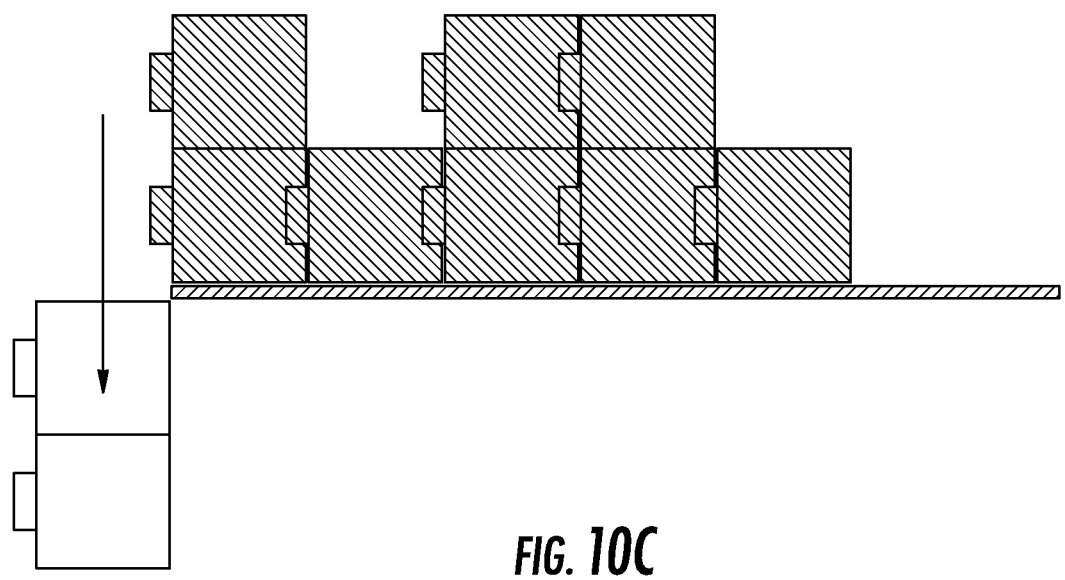

The novel technology for tote connections are not limited to a single tote in a row. The concept can be extended to embodiments wherein multiple totes are stacked on top of each other within the row, shown in FIGS. 10A-10C. The stacks, which can be comprised of at least one tote height or width, retain the ability to be coupled in the direction of the row. As one or more of the totes on the end stack are pulled, all tote stacks in the row move as well. As the totes are moved along the perpendicular direction and are clear of all totes in the previous row, they are decoupled.

Storage Structure Configurations—A second aspect of the invention involves the storage structure in which the totes are stored. The present invention provides two basic configurations for the storage structure.

Figure 11:
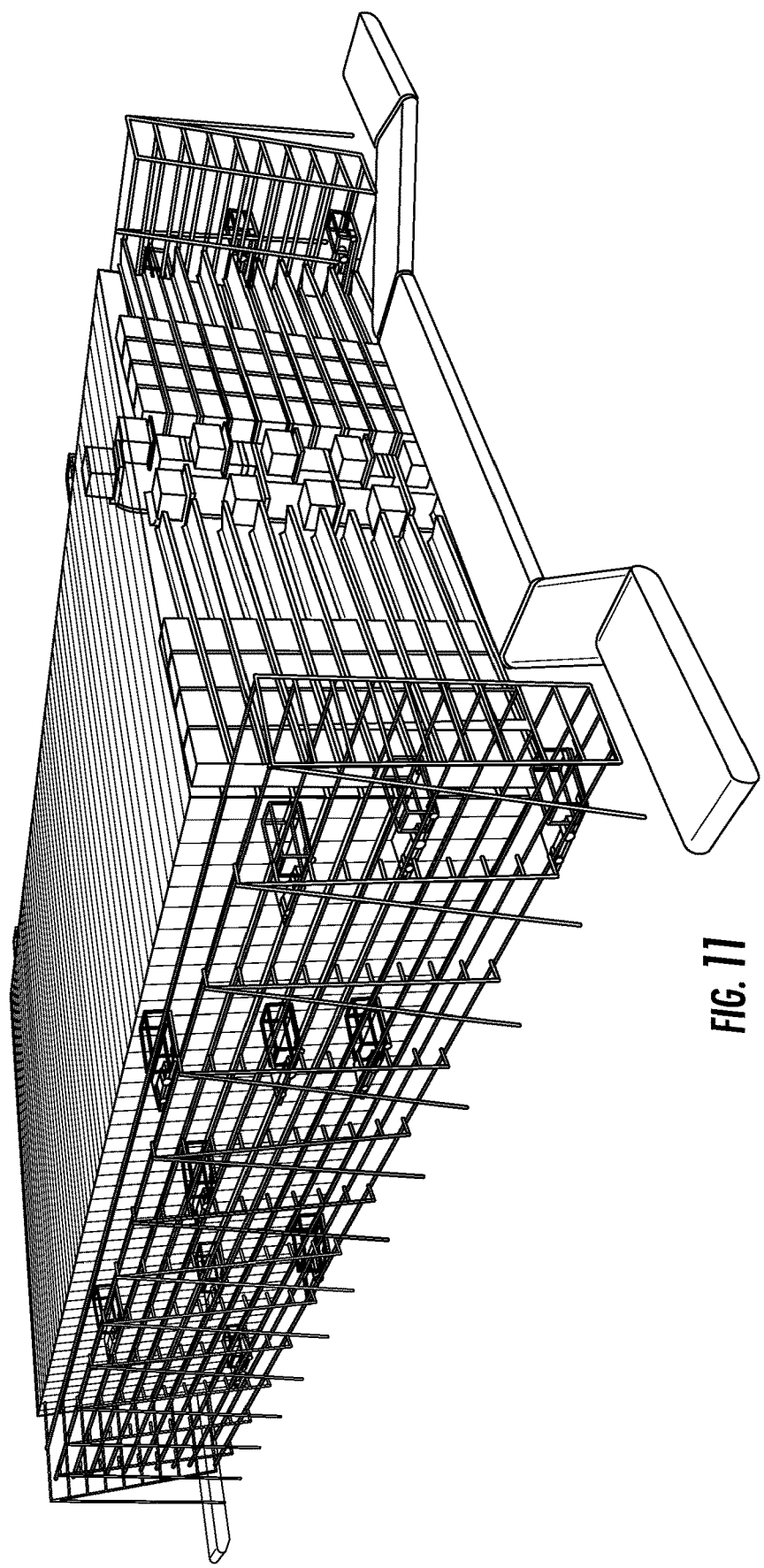
FIG. 11 shows a first embodiment of a storage structure for totes.
Figure 12:
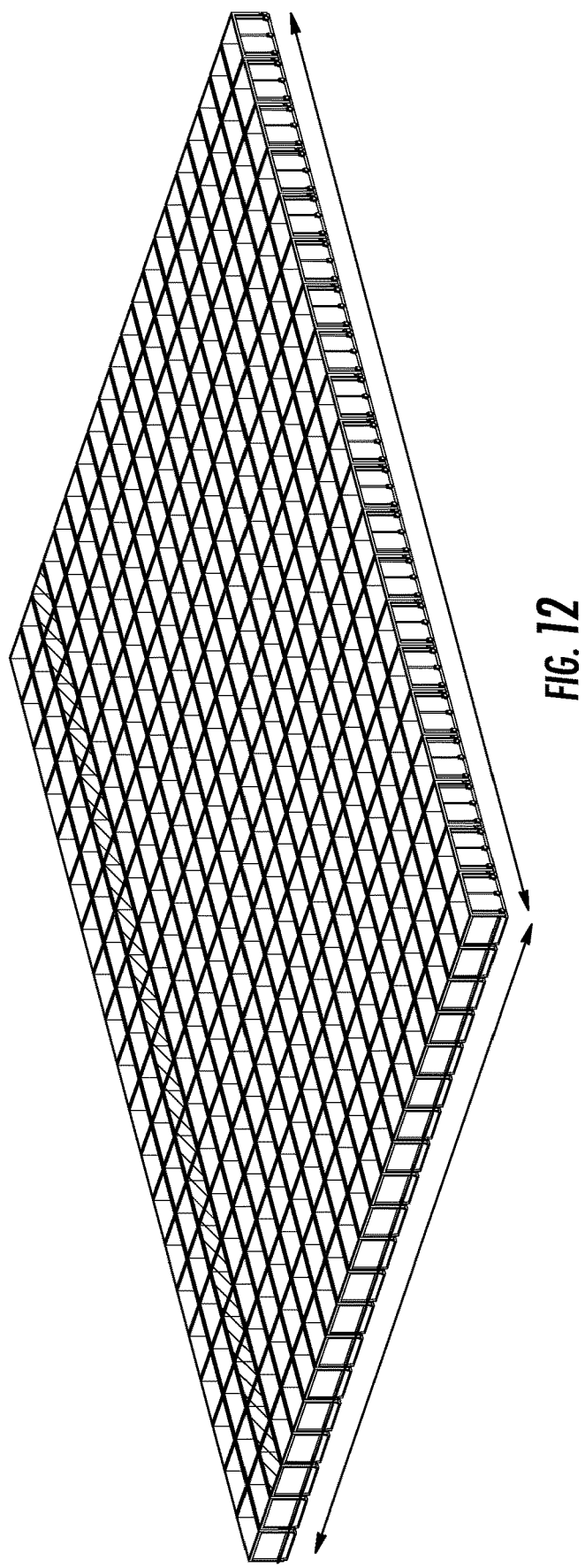
FIG. 12 shows a single layer of the first embodiment of the storage structure shown in FIG. 11.

In a first, preferred, embodiment of the invention, referred to herein as the "single-layer bot" embodiment, a layered storage structure concept, shown in FIG. 11 is used. In this configuration, the storage structure comprises multiple layers, as shown in FIG. 12, of connected totes. Note that while FIG. 12 shows a single layer as being completely full of totes, it is possible that, in operation, a single gap of any size may be found within any row of totes. In this embodiment of the invention, a carrier support structure is utilized at one end or both ends of each row to support one or more robotic carriers capable of manipulating a row of totes to store and retrieve a target tote.

Figure 13:
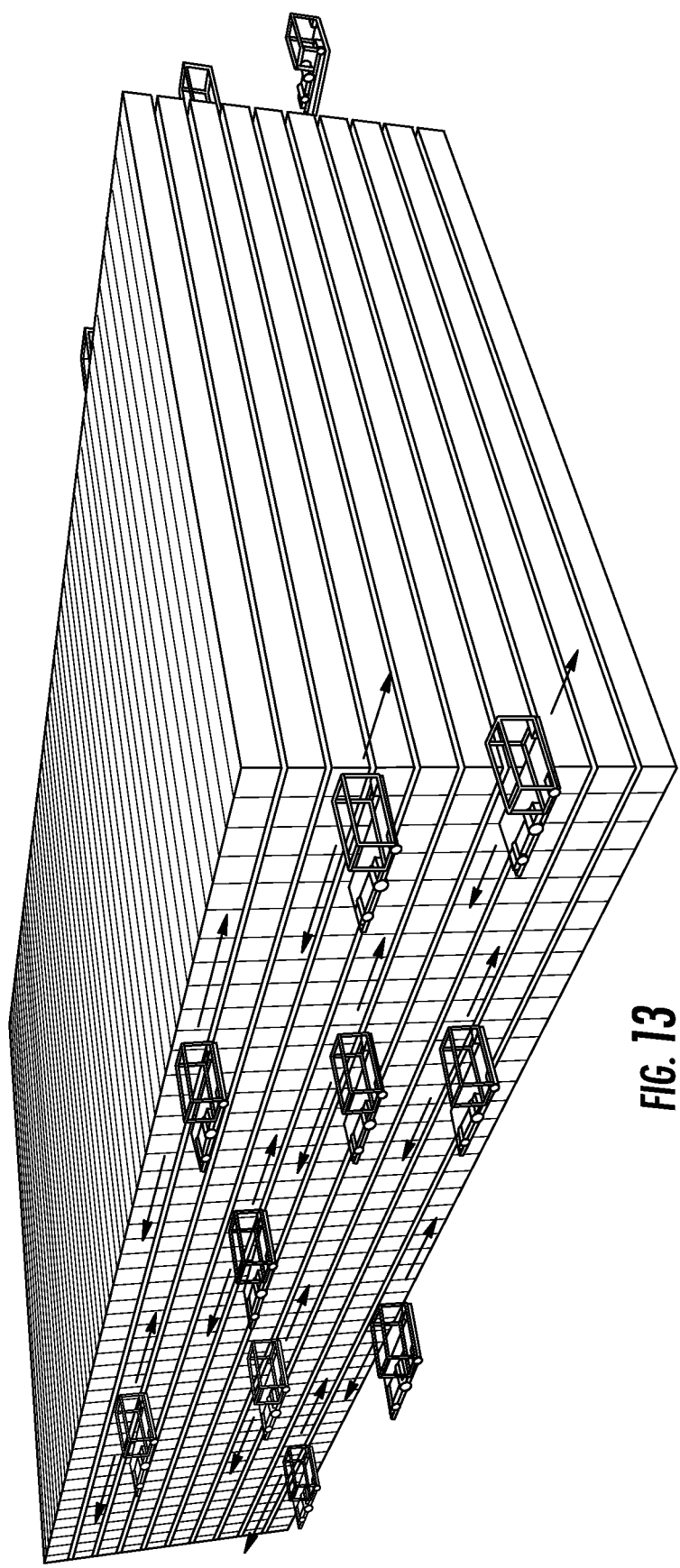
FIG. 13 shows the positioning of carriers on the exterior of the storage structure of FIG. 11.

In the single-layer bot embodiment, the carriers are restricted to moving only within layer of the support structure which they service (their "home" layer), as shown in FIG. 13 (although, in a variation of this embodiment, the single-layer bots may be moved between layers by a conveyer). Theoretically, the single-layer bot embodiment may operate with one bot per layer on one side of the storage structure, or one pair of robots per layer, with one bot of each pair disposed in the same layer on opposite sides of the storage structure, such as to be able to insert and remove totes from opposite sides of the structure. More realistically, multiple robots per layer may be provided for more efficient operation. In this configuration, the robots may only move within their home layer. Note that, while FIGS. 11 and 13 show the layers stacked horizontally, it is contemplated that the layers may also be stacked vertically. But at the minimum, only a single robotic carrier is needed to pull on the outer tote or totes to access any tote within a row.

Because the carriers are restricted to movement only within their home layer, the single-layer bot embodiment of the storage structure also requires a vertical input/output conveyor located at one or both ends of the structure, which allows movement of the totes from the layer from which they were retrieved down to the input/output conveyor, and to raise incoming totes from the input/output conveyor to the level the layer where they will be stored. The input/output conveyor is discussed in more detail below.

Figure 14:
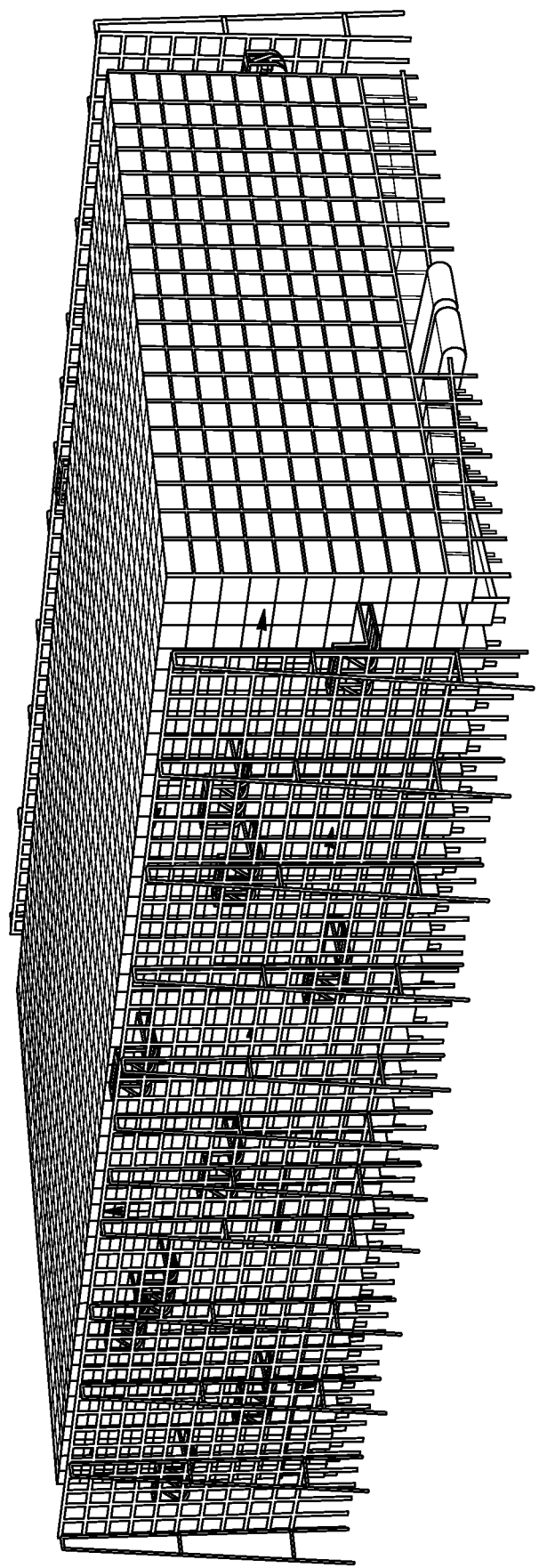
FIG. 14 shows a second embodiment of a storage structure for totes.
Figure 15:
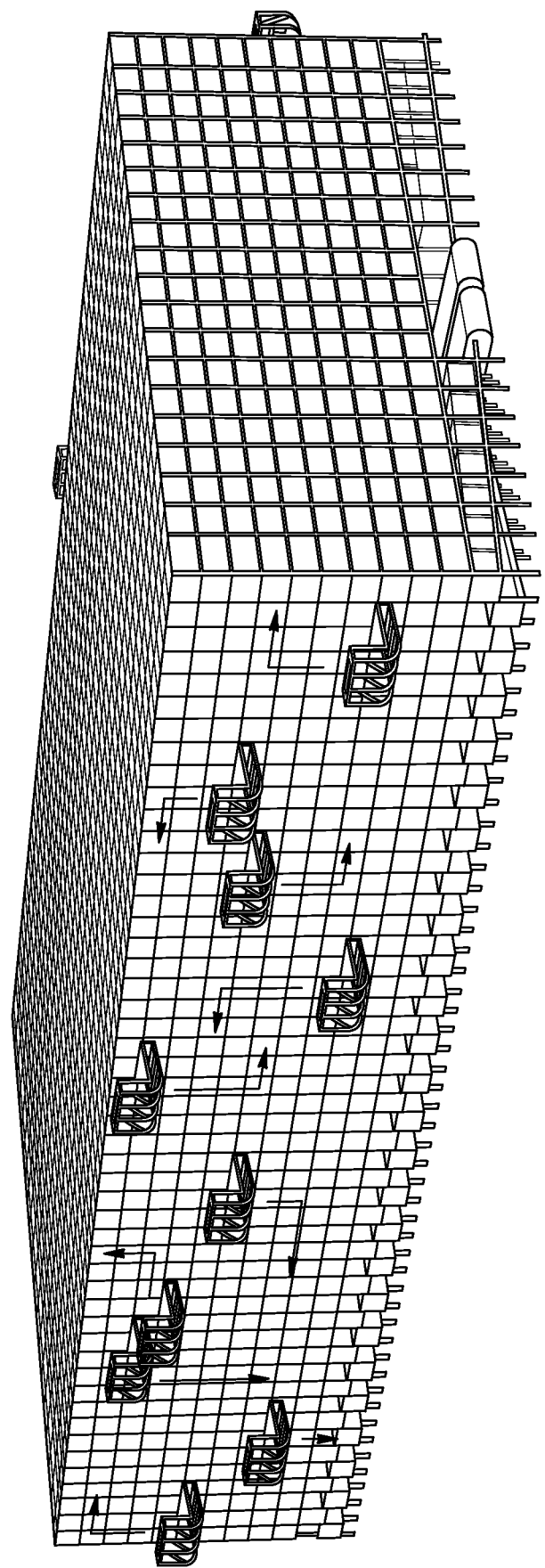
FIG. 15 shows the positioning of carriers on the exterior of the storage structure of FIG. 14.

A second embodiment of the storage structure is shown in FIG. 14 and is referred to herein as a "multi-layer bot" embodiment. In this embodiment, the carriers are able to move both vertically and horizontally, as shown in FIG. 15. Multi-layer bot carriers can therefore retrieve totes from any row in any layer or from the input/output system and deliver the totes to any row in any layer, or to the input/output system.

Figure 16:
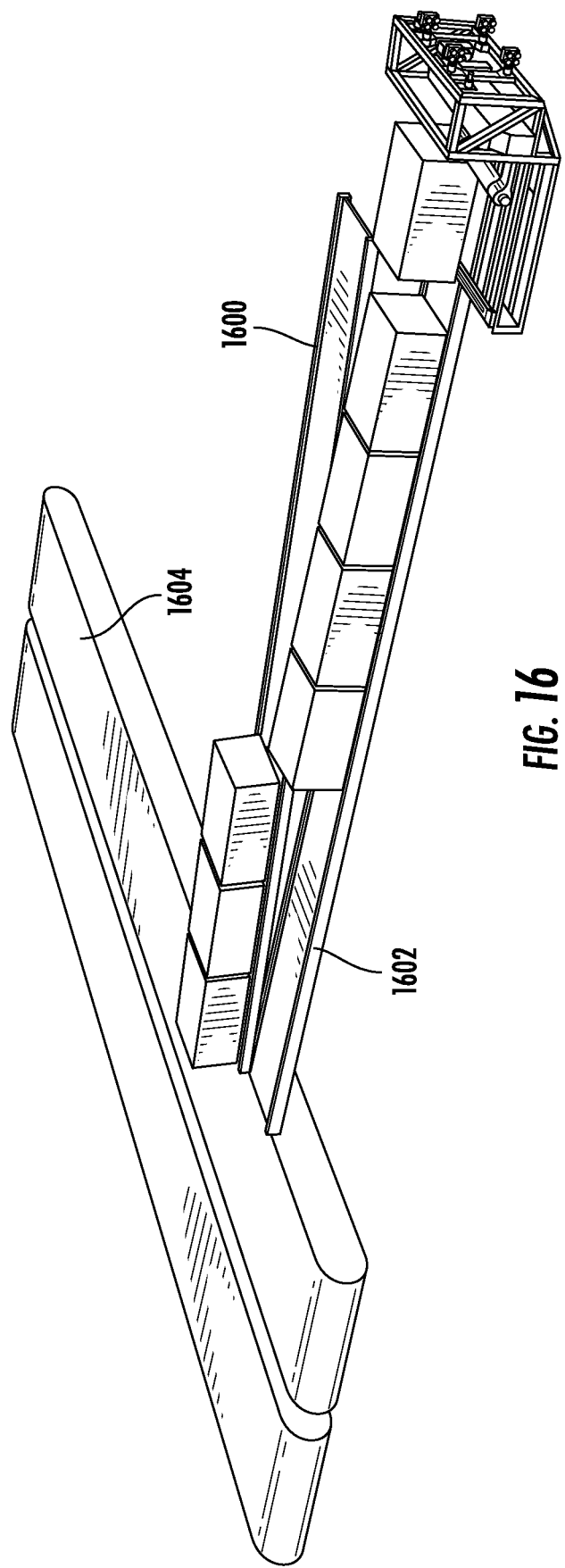
FIG. 16 shows an input/output mechanism for use with the storage structure of FIG. 14.

In this embodiment, the input/output system may consist of a pair of conveyors running longitudinally through the middle of the support structure as shown in both FIGS. 14 and 15. Other configurations of the input/output system may also be used with this embodiment. Detail of the input/output system is shown in FIG. 16 and will be discussed in more detail below.

Carrier Configurations—The carrier configurations for use with the single-layer bot and multi-layer bot storage structures are described in this section.

Figure 17:
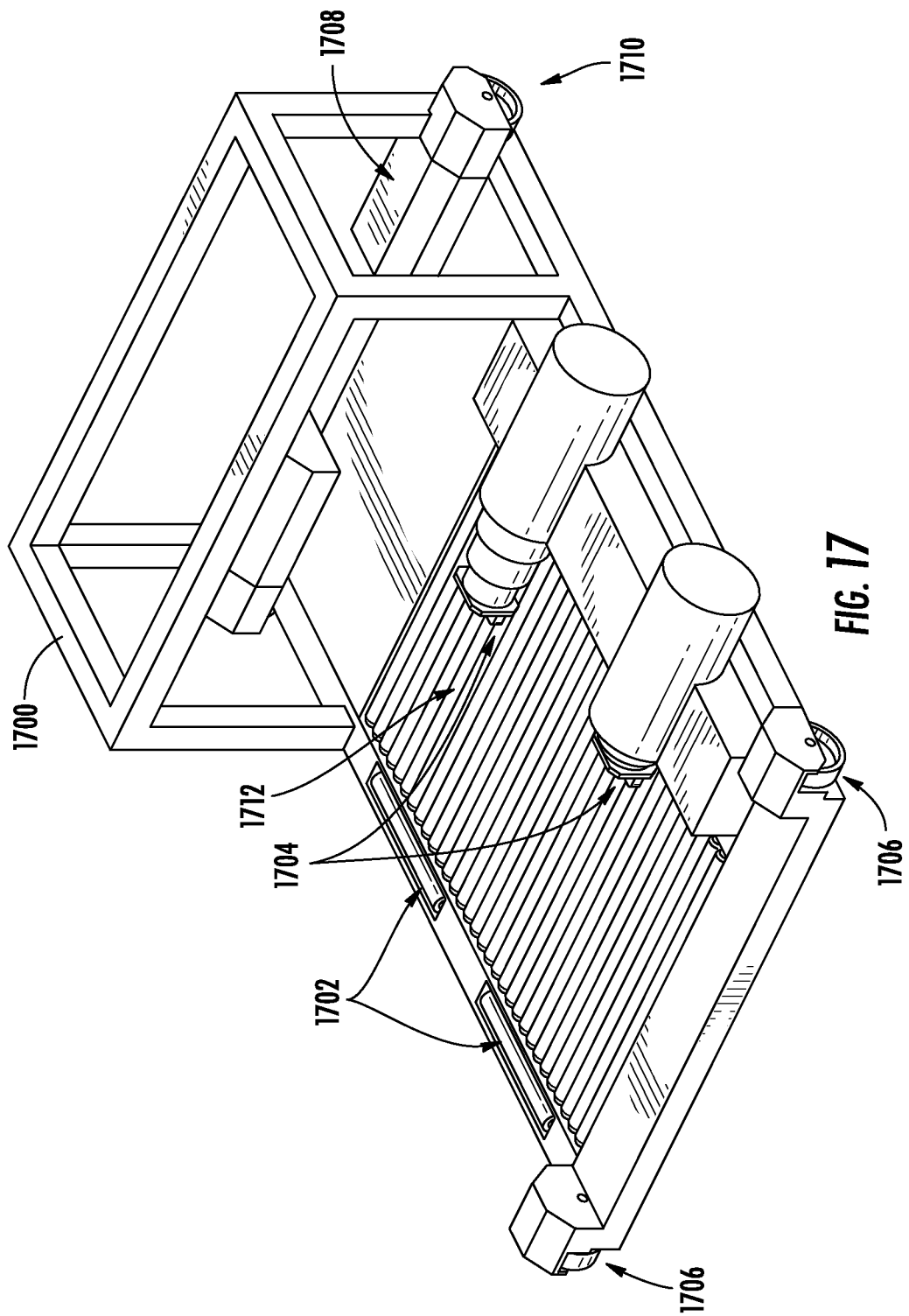
FIG. 17 shows one embodiment of a carrier for use with the storage structure of FIG. 11.

FIG. 17 shows a first embodiment of a carrier 1700 for use with the single-layer bot storage structure. Carrier 1700 is capable of moving back and forth in the longitudinal direction driven by drive wheels 1710 and supported by idler wheels 1706. The carrier shown in FIG. 17 is capable of servicing two rows of its home layer at a time. That is, a first tote can be pulled from a first row simultaneously with a second tote being pushed into a second row. Push/pull actuators 1704 are capable of pulling an entire roll of totes from the layered bot storage structure such that the first tote in the row rests in a first position on conveyor roller 1712. The tote may then be shifted to a second position using conveyor rollers 1712 where may be pushed into a second row by push/pull actuators 1704.

Note that, in this embodiment, the movement of the tote from the first to the second position via conveyor rollers 1712 on carrier 1700 enables the passive decoupling of the tote from the row from which it was retrieved. As the tote is then pushed into its destination row, the tote is passively coupled to the first tote in the destination row if there is a tote at the end of the row. If there is a gap in the destination row, totes may continue to be pushed into the destination row until the gap is closed and all totes in the destination row have been passively coupled via their longitudinal motion causing contact of the coupling mechanisms of the totes.

In a second embodiment, carrier 1700 may also be configured with de-latch rollers 1702, as described above with respect to FIGS. 5A-5D, to decouple the tote from its row.

Note that, while FIG. 17 shows carrier 1700 capable of handling two totes simultaneously, the invention is not meant to be limited thereby. Carriers may be configured with any number of places for accepting totes, including embodiments having a single place, in which case the carrier must move to place the tote in its destination row. Theoretically, carrier 1700 could be configured with a number of places equal to the number of rows in its home layer. In such embodiments, drive wheels 1710 and idler wheels 1706 would become superfluous as the carrier would not move within its home layer.

Figure 18:
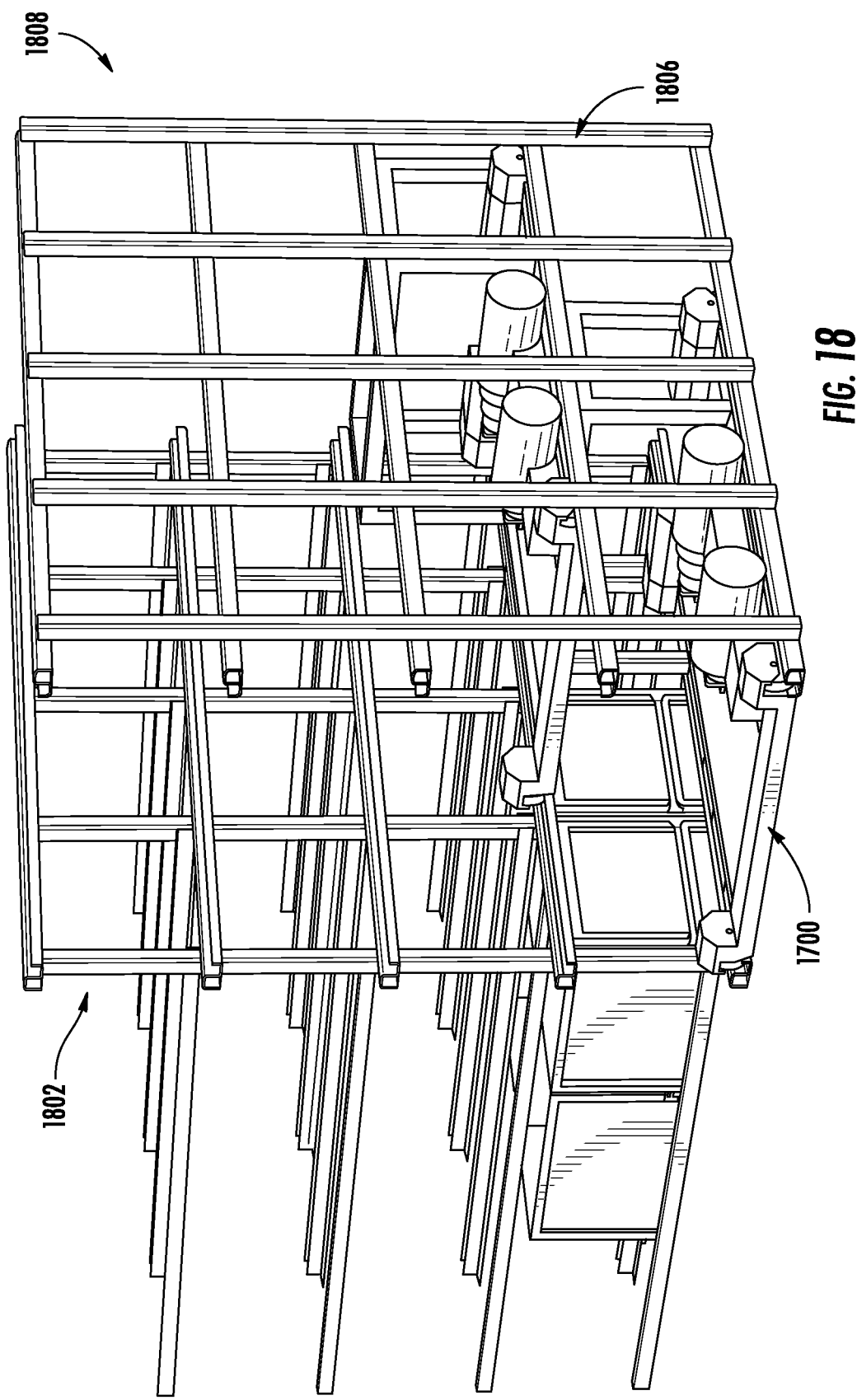
FIG. 18 shows a support structure for supporting the carriers shown in FIG. 17 for use with the storage structure FIG. 11.

FIG. 18 shows the interaction of carrier 1700 with the single-layer bot version of the storage structure 1802 and the outboard frame structure 1806. Carrier support structure 1806 includes tracks 1808 along which carrier 1700 will roll or slide to access the rows of its home layer. Note that, in this configuration, there are two outboard carrier support structures 1806, one positioned as shown on one end of the storage structure 1802 and a second one positioned on the opposite side of the storage structure 1802.

Figure 19:
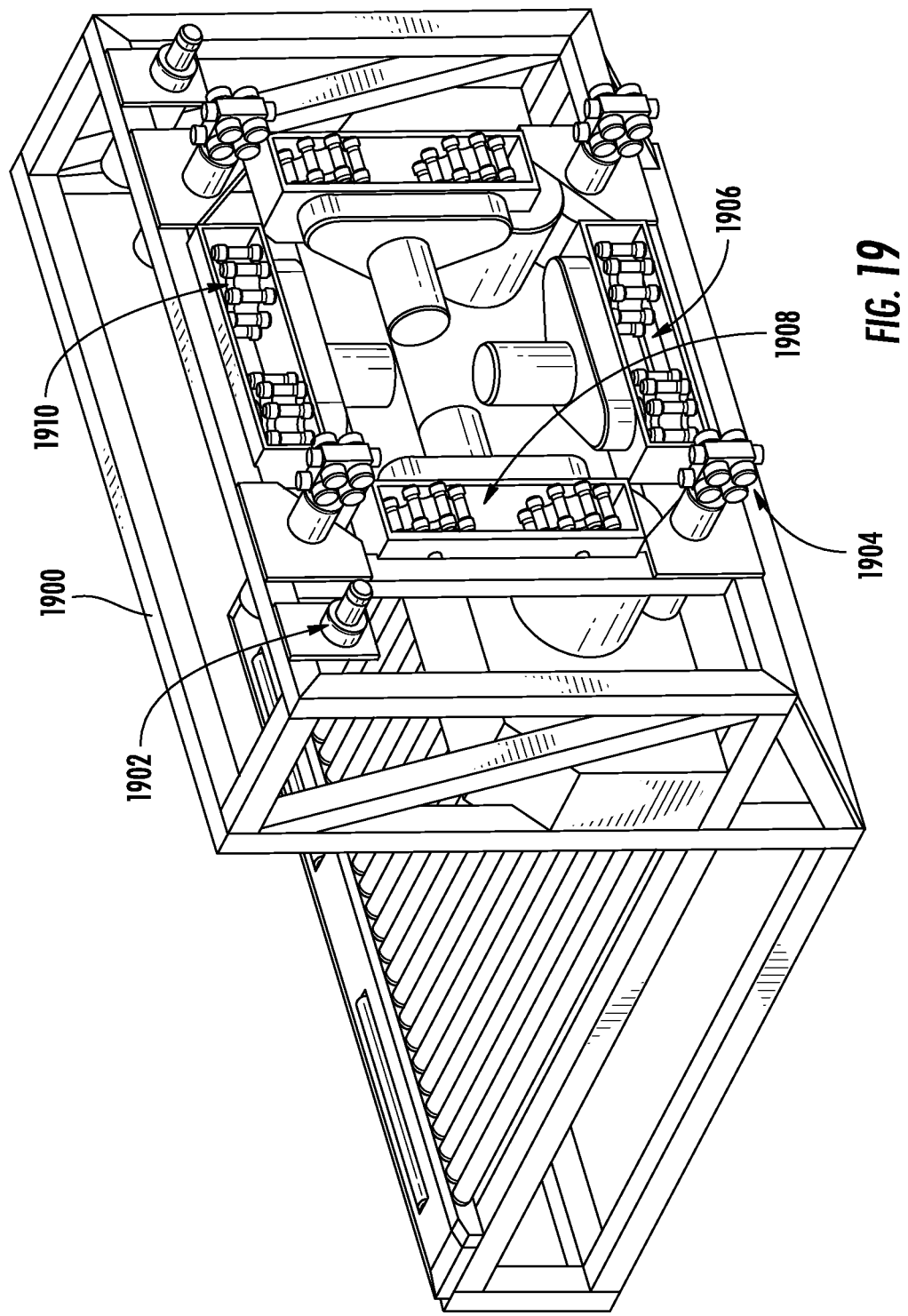
FIG. 19 shows one embodiment of the carrier for use with the storage structure of FIG. 14.

FIG. 19 shows a second embodiment of carrier 1900 for use with the multi-layer bot configuration of the storage structure. In this embodiment, the carrier 1900 can move both vertically and horizontally with the carrier support structure 2002 shown in FIG. 20. FIG. 19 shows the mechanism allowing the two-dimensional movement of carrier 1900 which includes roller pinion 1910 which will engage with racks disposed on the support frame structure. The roller pinions 1910 are driven by an X-axis or horizontal drive 1906 and Z-axis or vertical drive 1908. Carrier 1900 may also include steering assembly 1904 and retractable rollers 1902 for interaction with the carrier support structure 2002.

Figure 20:
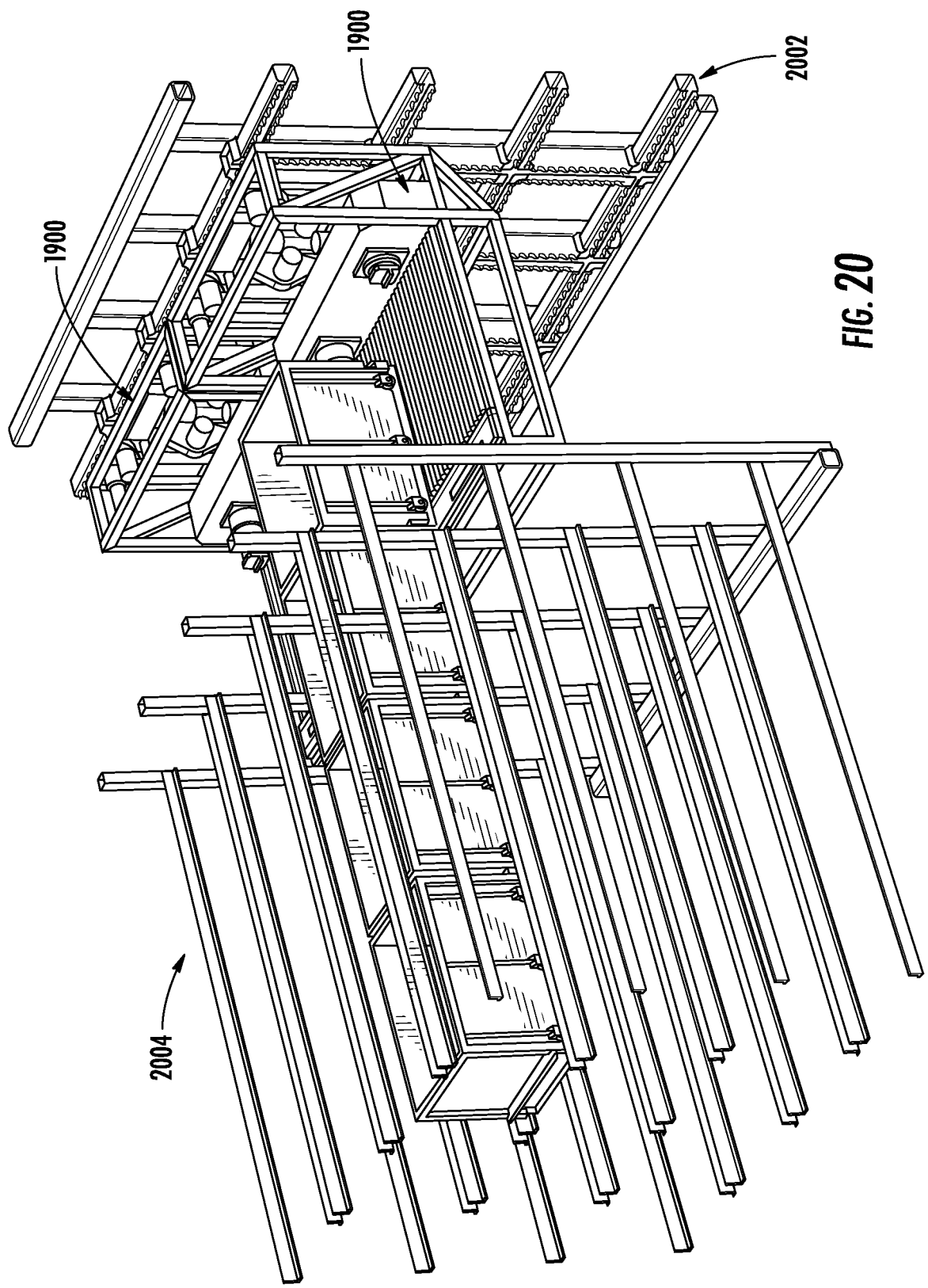
FIG. 20 shows a support structure for supporting the carrier shown in FIG. 19 for use with the storage structure of FIG. 14.
Figure 21:
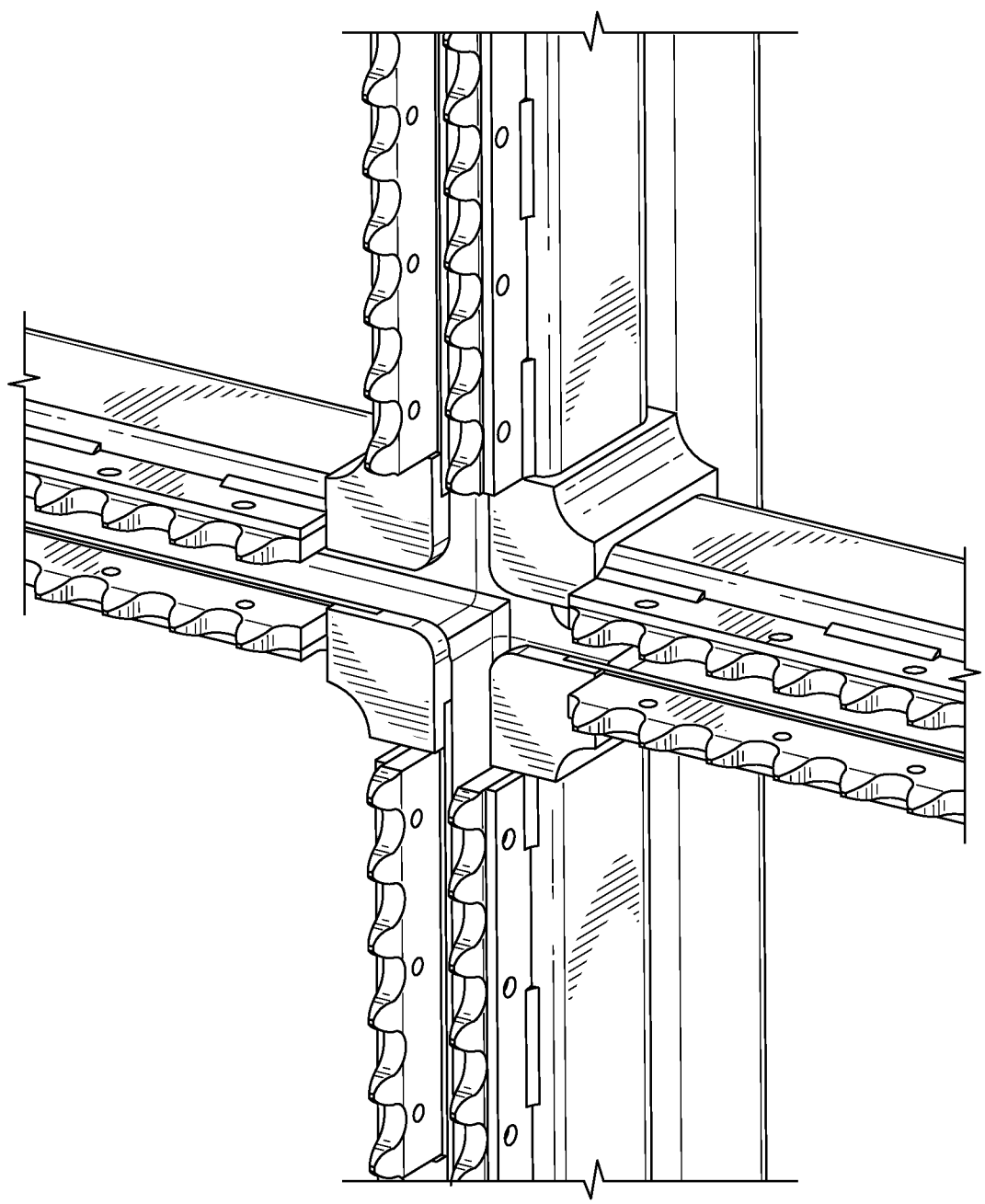
FIG. 21 is a detailed view of a portion of the support structure shown in FIG. 20.

FIG. 20 shows carrier 1900 in place on carrier support structure 2002 servicing storage structure 2004. FIG. 21 shows detail of the carrier support structure 2002 showing toothed racks (both vertical and horizontal) for accepting vertical and horizontal pinions 1910.

Figure 22:
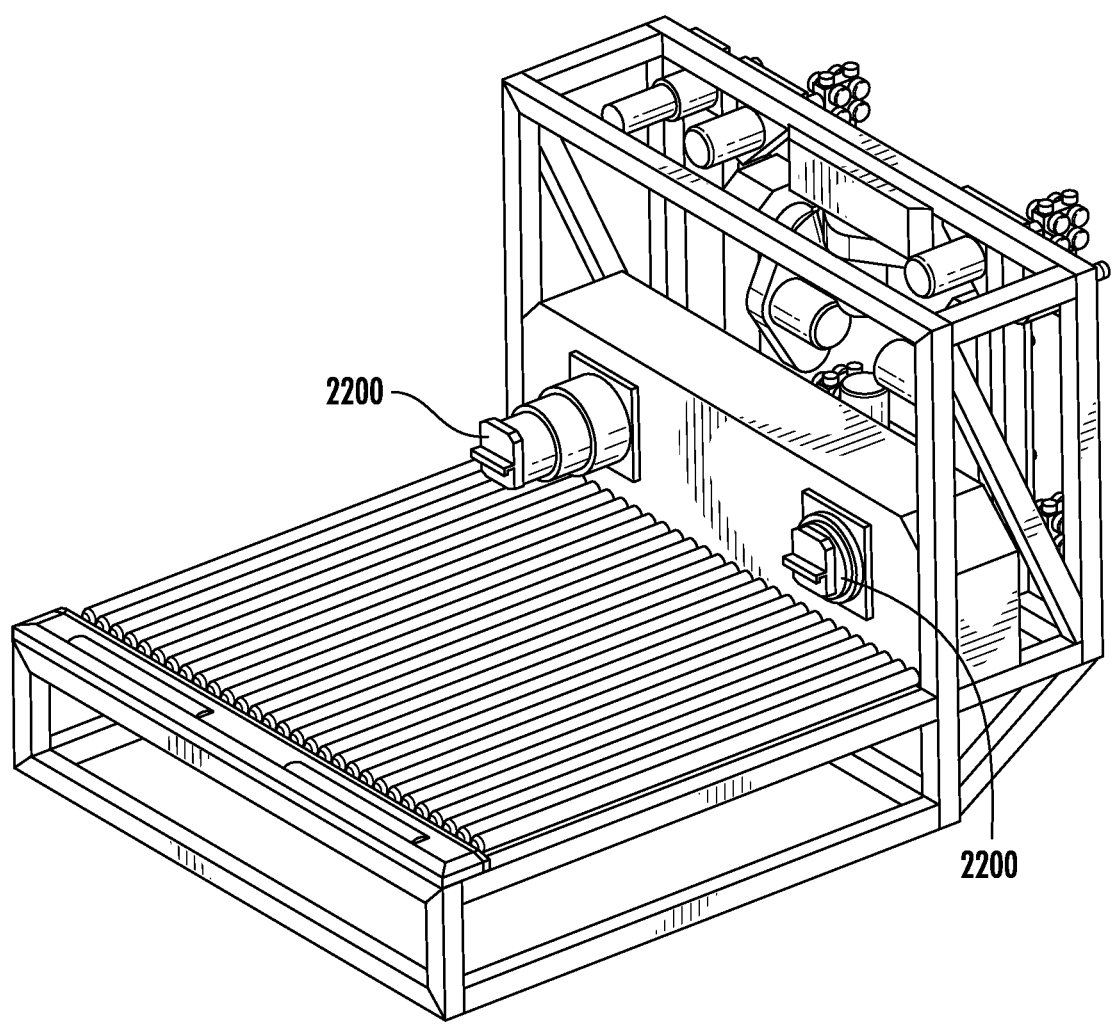
FIG. 22 shows a first embodiment of the push/pull mechanism for pushing and pulling rows of totes within the storage structures of FIG. 11 or FIG. 14.

FIG. 22 shows a first embodiment of a push/pull mechanism for pulling a row of connected totes from the storage structure such that the first tote in the row is positioned on the conveyor of the carrier, and for pushing a tote already on the carrier into a destination row. FIG. 22 shows the use of telescoping actuators 2200 for use as a push/pull mechanism. Telescoping actuators 2200 would be configured with a hook on one end capable of interacting with the coupling mechanism on the totes. Actuators 2200 could be any type of actuator, for example, pneumatic, hydraulic, electric, etc.

Figure 23A:
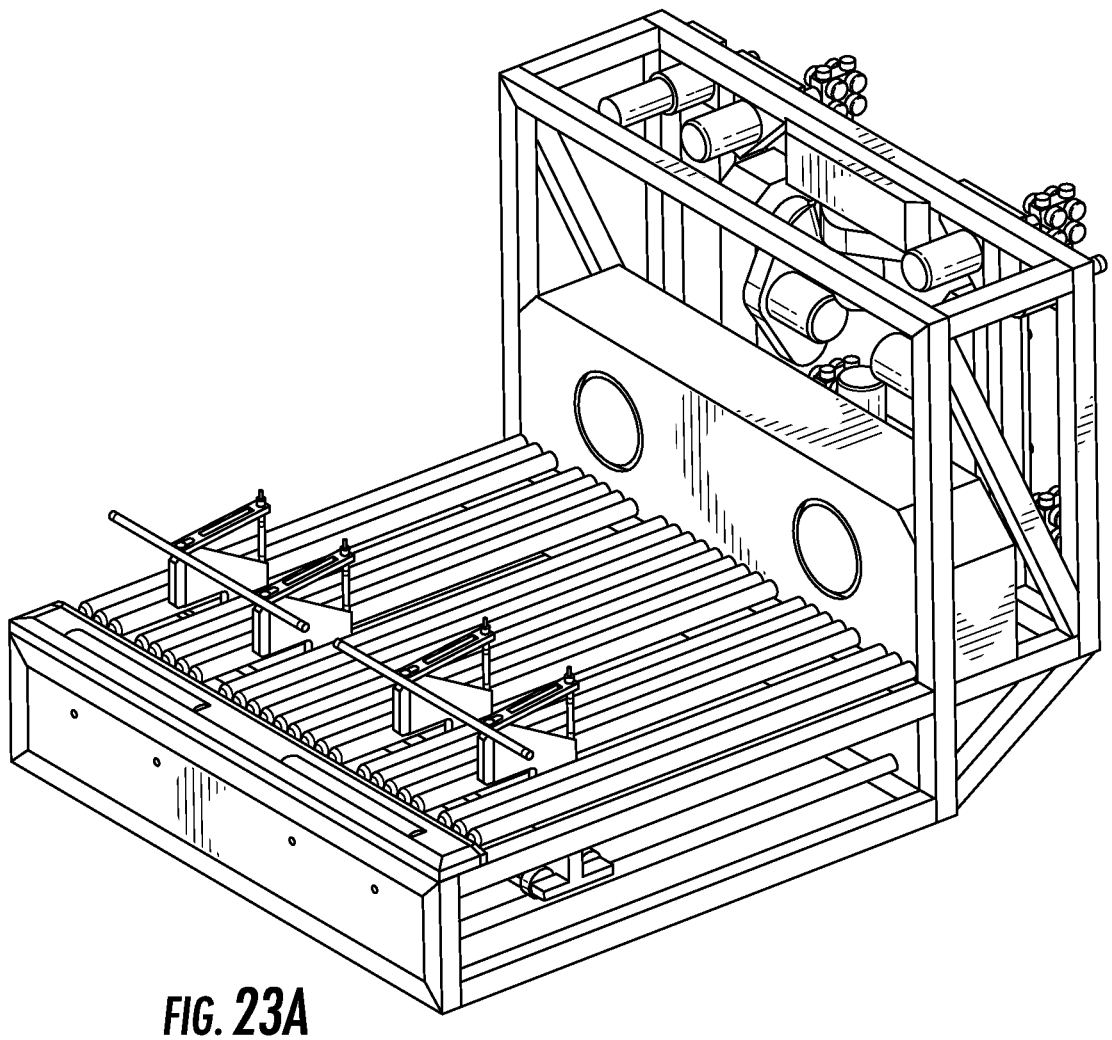
FIGS. 23A-23B show a second embodiment of the push/pull mechanism for pushing and pulling rows of totes within the storage structures of FIG. 11 or FIG. 14.
Figure 23B:
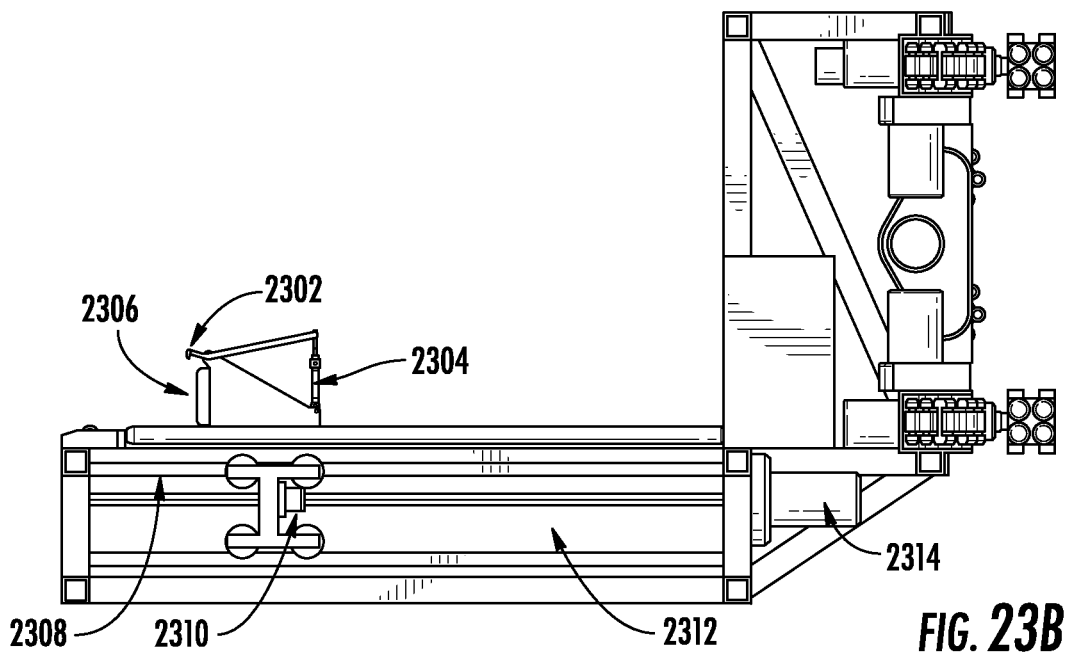

FIGS. 23A-23B show a preferred embodiment of the push/pull mechanism, shown in perspective in FIG. 23A and in cross-section in FIG. 23B. To pull on a tote, linear actuator 2314 pushes pull bar platform 2310 towards the tote with the pull bar 2302 raised. Pull bar 2302 is brought into position and is dropped into place by latch actuator 2304. The linear actuator 2314 then reverses and pulls the tote onto the carrier while latch actuator 2304 holds the pull bar 2302 down in the locked position. Aligning multiple pull bars allows a tote to be shifted along the carrier. To insert the tote into a different row, linear actuator 2314 is actuated to push against the tote with push bumper 2306 with the pull bar 2302 in the unlocked position.

Note that, although the push/pull mechanisms shown in FIGS. 22 and 23A— 23B are shown in use with the multi-layer bot version of the carrier, either configuration may be used with the single-layer bot version of the carrier shown in FIG. 17 as well. Also, it should be noted that, in alternate embodiments, carriers may be fitted with only a push capability or only a pull capability.

Figure 24A:
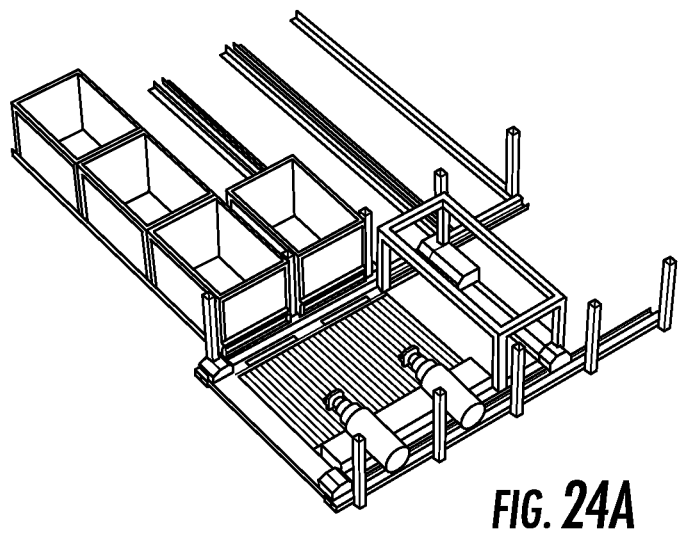
FIGS. 24A-24G show the process of pushing and pulling totes to move totes from one row to another.
Figure 24B:
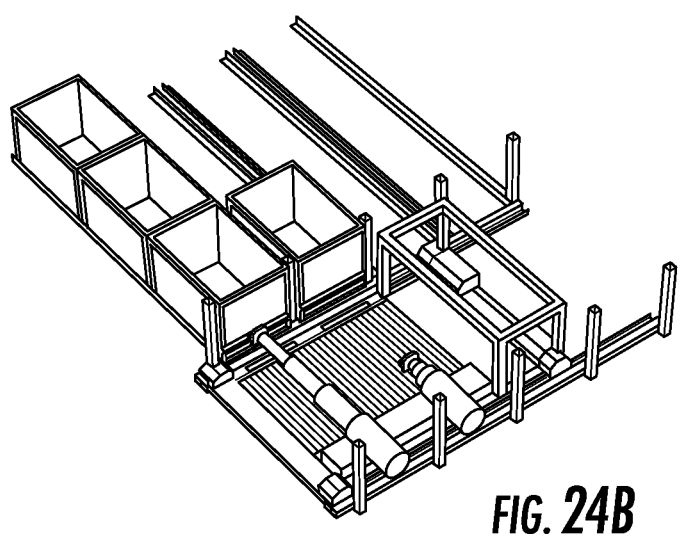
Figure 24C:
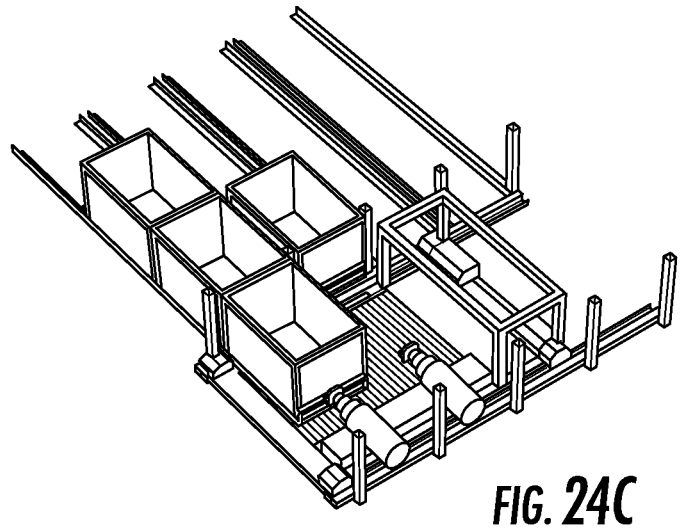
Figure 24D:
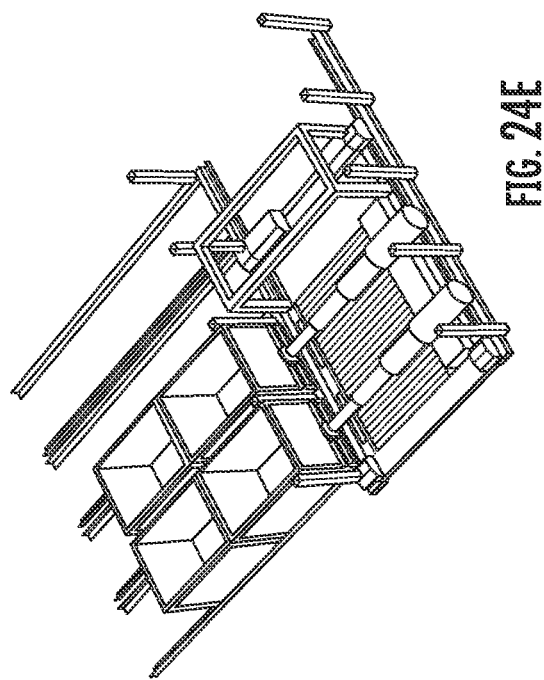
Figure 24E:
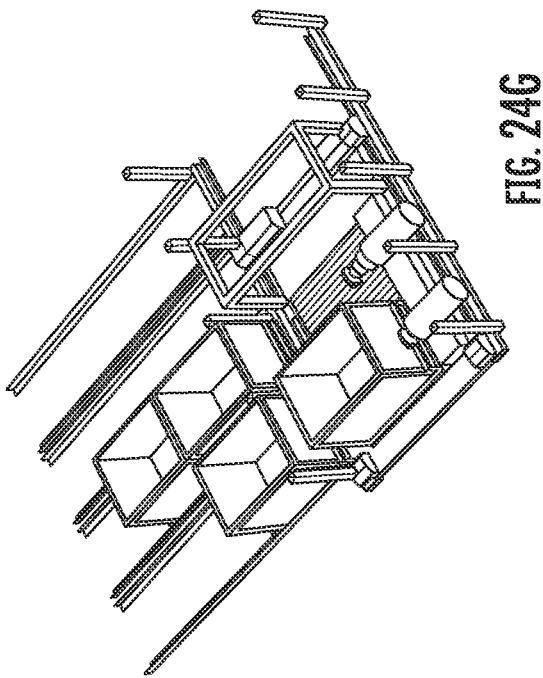
Figure 24F:
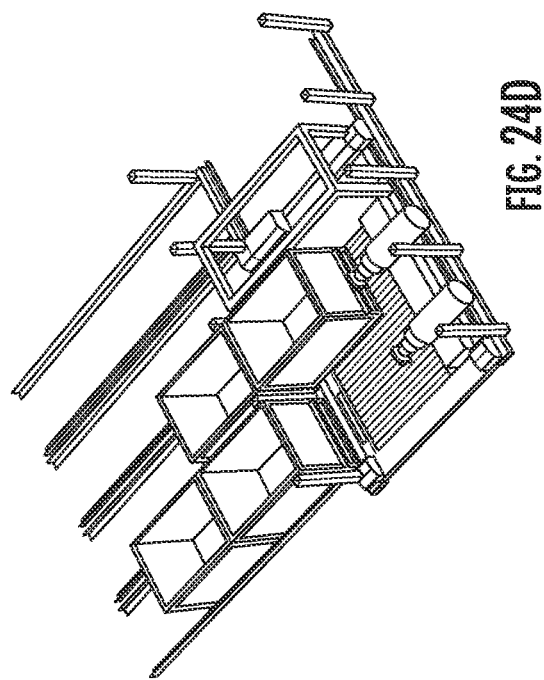
Figure 24G:
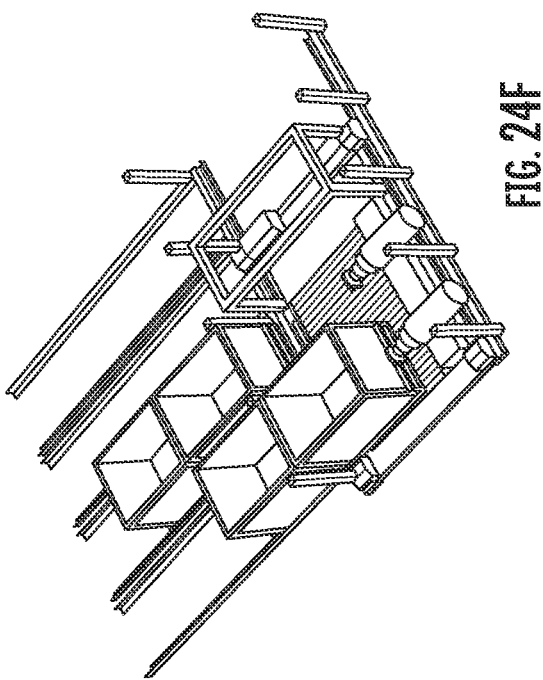

FIGS. 24A-24G show the carrier actuation motion. In FIG. 24A, the actuators are retracted upon arrival at the designated rows within the storage structure. FIG. 24B shows the extension of actuator A grabbing the tote at the end of the row. FIG. 24C shows the retraction of actuator A, which pulls the tote onto the carrier (and moves all the connected totes in the row towards the carrier). FIG. 24D shows the conveyor shifting the tote to the adjacent row. Note that the perpendicular movement of the tote with respect to its row passively decouples it from its row and may automatically couple it to the next row. Alternatively, the tote may be automatically coupled to the next row when pushed onto the row by actuator B. FIG. 24E shows both actuators A & B extended. Actuator A grabs the next tote while actuator B pushes the previous tote into the adjacent row. FIG. 24F shows retraction of both actuators A & B, which pulls the next tote from onto the carrier. FIG. 24G shows a tote being decoupled from its row using the latch rollers 1712 shown in FIG. 17.

Input/Output Mechanisms—In addition to retrieval, storing and shuffling of totes, the system must be capable of outputting a tote from the system and intaking a tote to the system. In both embodiments of the storage structure this is accomplished via an input/output mechanism.

FIG. 11 shows the input/output mechanism for the single-layer bot configuration of the storage structure. Totes are delivered to and from the input/output mechanism via a conveyor. Note that, in certain embodiments of the invention the input/output mechanism may be located on both sides of the storage structure, while in other embodiments, the input/output mechanism may only be located on one side of the storage structure. In yet other embodiments, one or more input/output mechanisms may be located at any convenient location in proximity to the storage structure, including, for example, on the interior of the storage structure, underneath the storage structure or on top of the storage structure.

Figure 25:
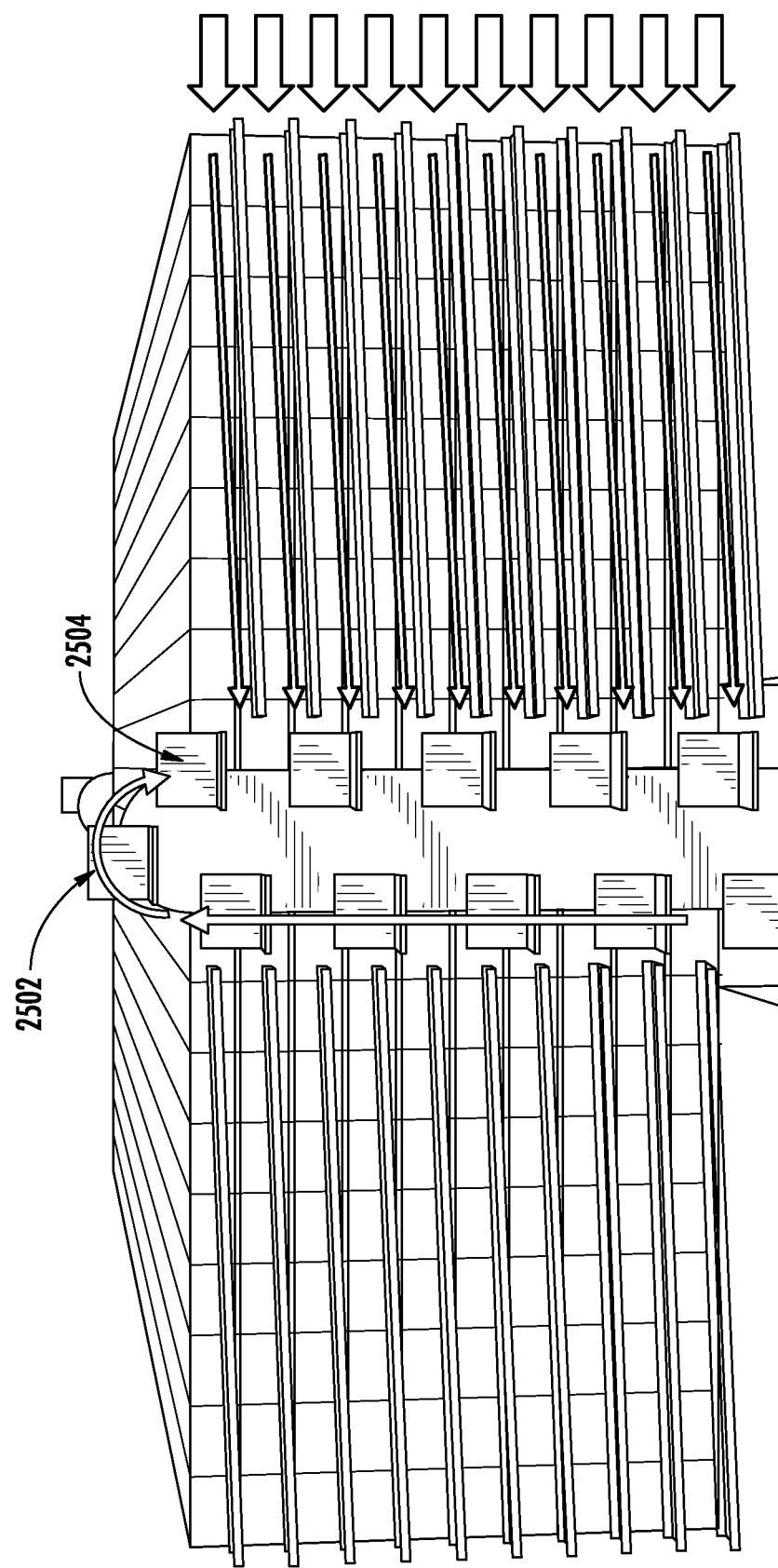
FIG. 25 shows the output portion of the input/output mechanism for use with the storage structure of FIG. 11.

FIG. 25 shows one possible embodiment of a process for outputting totes from the storage structure. In this embodiment, carriers 1700 convey a retrieved tote to the output buffer ramps 2504. The ramps are sloped such that the totes, once placed on the ends of the ramps nearest the carriers 1700 will roll or slide down the ramp 2502. A mechanism (not shown) may be provided to stop the downward motion of the tote until an open spot on vertical conveyer 2502 arrives at the bottom of the ramp, at which time the mechanism will allow the tote to continue its downward motion onto vertical conveyer 2502. Vertical conveyor 2502 rotates with a circular motion and, when the retrieved tote reaches the bottom of the vertical conveyor 2502, it is pushed onto the conveyor shown in FIG. 11.

Figure 26:
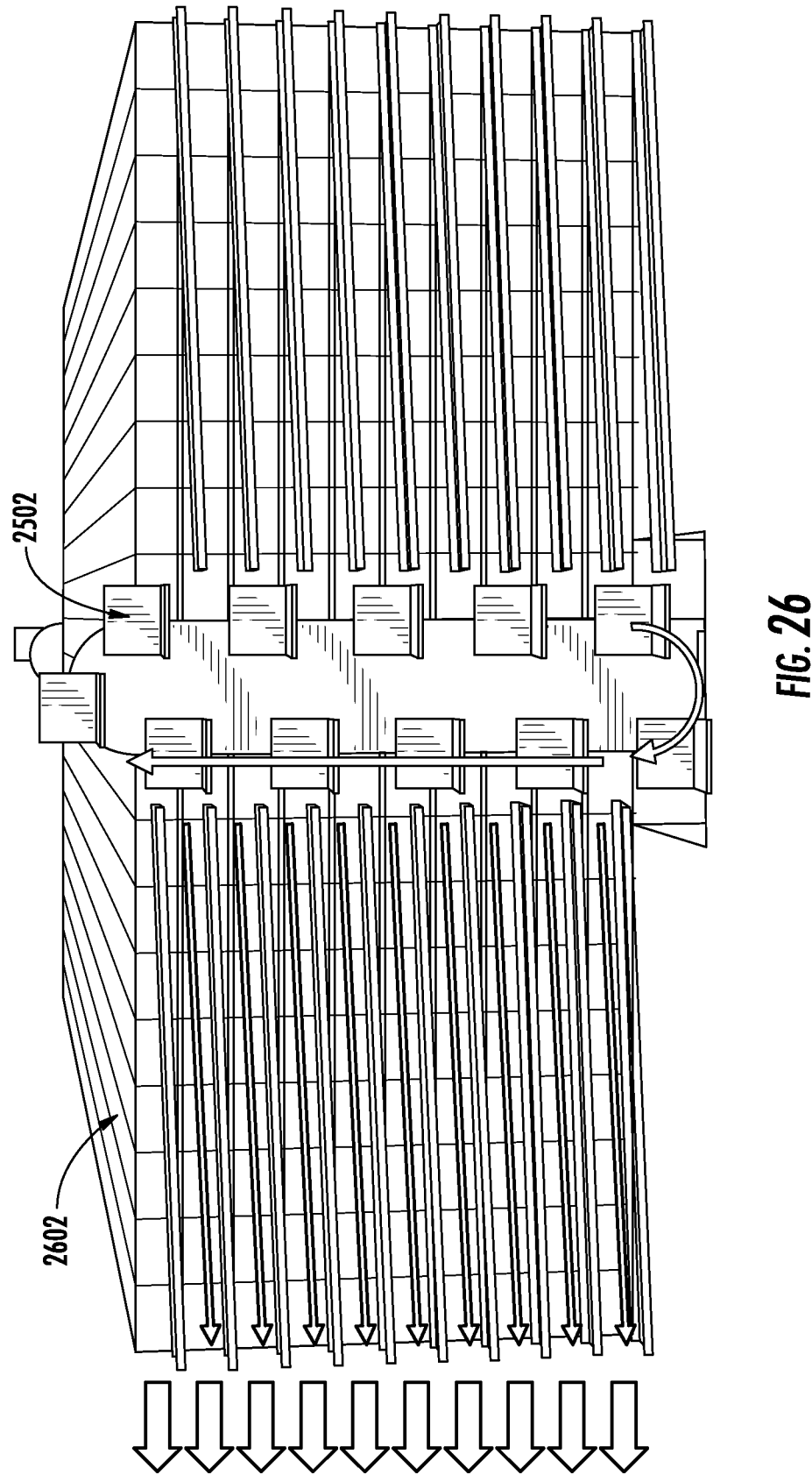
FIG. 26 shows the input portion of the input/output mechanism for use with the storage structure of FIG. 11.

FIG. 26 shows one possible embodiment of a process for inputting totes into the storage structure. In this embodiment, totes arrive at the bottom of vertical conveyor 2502 via the horizontal conveyor shown in FIG. 11. When a spot is available on vertical conveyor 2502, the tote is pushed onto the conveyor and raised to a level slightly higher than the level of its destination layer. The tote is then pushed onto an input buffer ramp 2602 and rolls or slides passively down the ramp. A mechanism (not shown) may be provided to stop the downward motion of the tote until carrier 1700 arrives at the bottom of the ramp, at which time the mechanism will allow the tote to continue its downward motion onto carrier 1700. Carrier 1700 then proceeds to place the tote in the appropriate row within its home layer.

Figure 27:
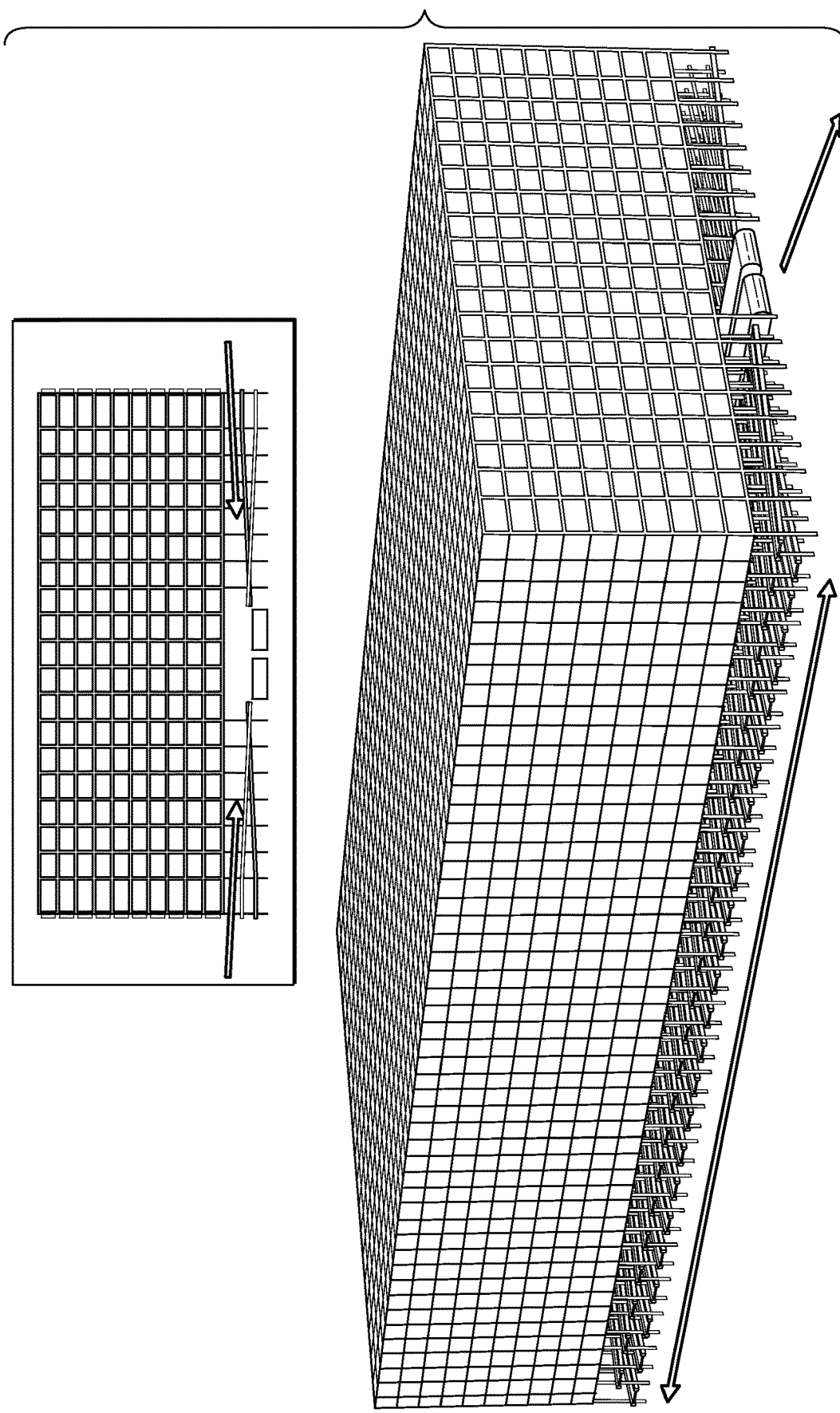
FIG. 27 shows the output portion of the input/output mechanism for use with the storage structure of FIG. 14.

FIG. 27 shows one possible embodiment of a mechanism for outputting totes from the storage structure in the multi-layer bot configuration. In this embodiment, the multi-layer bot configuration, the bottom two rows of the storage structure may be reserved for input and output buffers. The output buffers consist of alternating rows on each side of the structure. The inset of FIG. 27 shows a side view of the mechanism. Totes are retrieved from their source layers by the two-dimensional carriers 1900 and are transported vertically to an output buffer located on one end of the storage structure. The tote is pushed off of carrier 1900 onto a downward facing ramp 1600, as shown in the inset of FIG. 27 and in FIG. 16, where it rolls or slides downward. A mechanism (not shown) may be provided to stop the downward motion of the tote until an open spot on conveyer 1604 arrives at the bottom of the ramp, at which time the mechanism will allow the tote to continue its downward motion onto conveyer 1604. Conveyor 1604, then transports the tote to the end of the structure where it is pushed onto a horizontal conveyor as shown in FIG. 11.

Figure 28:
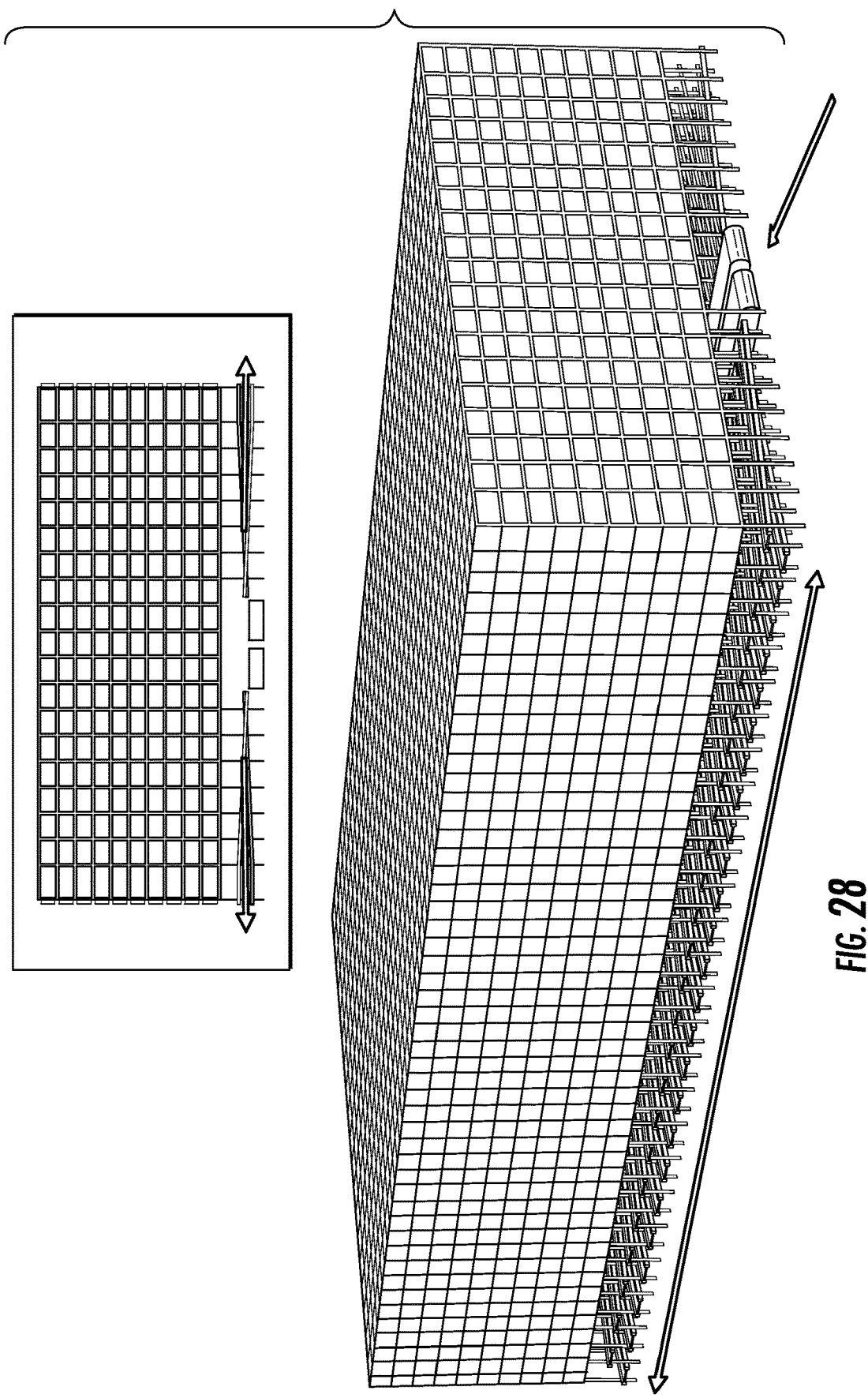
FIG. 28 shows the input portion of the input/type of mechanism for use with the storage structure of FIG. 14.

One possible embodiment of an input process for the multi-layer bot configuration is shown in FIG. 28. In this embodiment, totes are delivered to conveyor 1604 via the horizontal conveyor shown in FIG. 11. Conveyor 1604 delivers the tote to an input buffer located in the first row of the storage structure. The tote is then pushed onto a downward facing ramp 1602, as shown in the inset of FIG. 28 and in FIG. 16 and rolls or slides down the ramp. A mechanism (not shown) may be provided to stop the downward motion of the tote until a two-dimensional carrier 1900 arrives at the bottom of the ramp, at which time the mechanism will allow the tote to continue its downward motion onto carrier 1900 on the outside of the storage structure. The two-dimensional carrier 1900 picks up the tote and transports it vertically to its destination layer, and horizontally to its destination row. Totes may roll or slide down the ramps passively, or they may be assisted by actuators.

Figure 29:
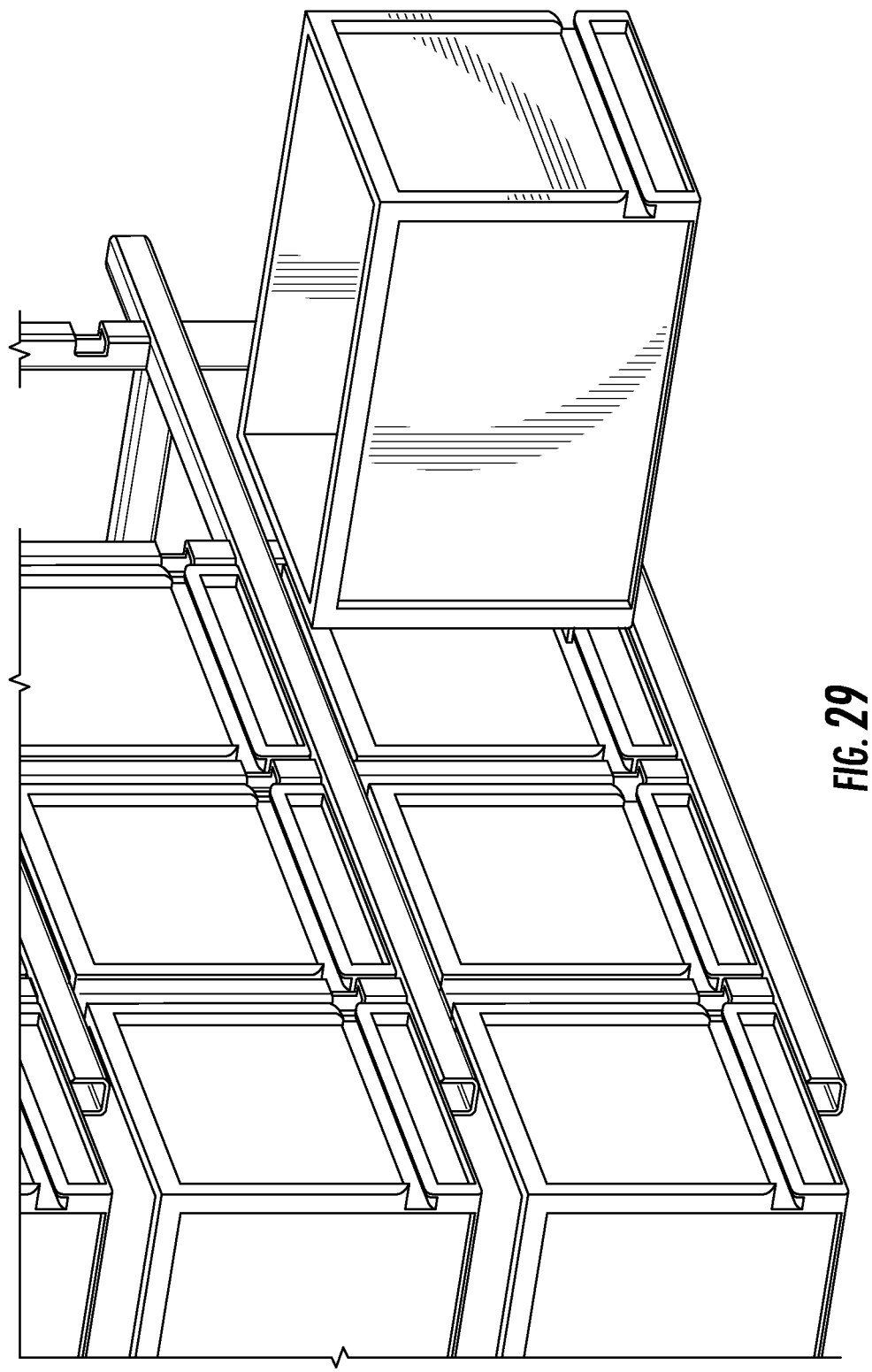
FIG. 29 shows a perspective view of a tote holding structure.

Storage and Retrieval Schemes—The carriers described herein are able to move along the outside face or faces of the storage structure to target row locations to be able to service rows within a limited range or along the whole face of the storage structure. Such a storage structure is shown in FIG. 29 in a multilayer configuration.

Figure 30:
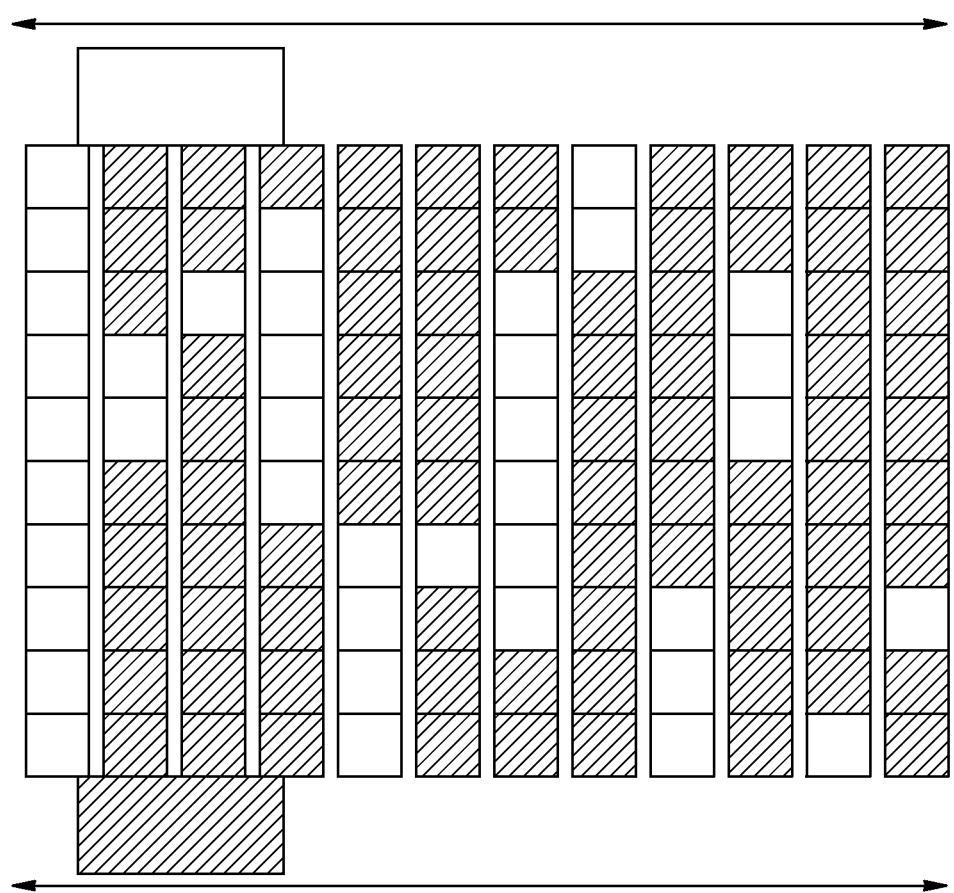
FIG. 30 shows a structure configuration having tandem carriers moving along the outside of the rows.
Figure 31:
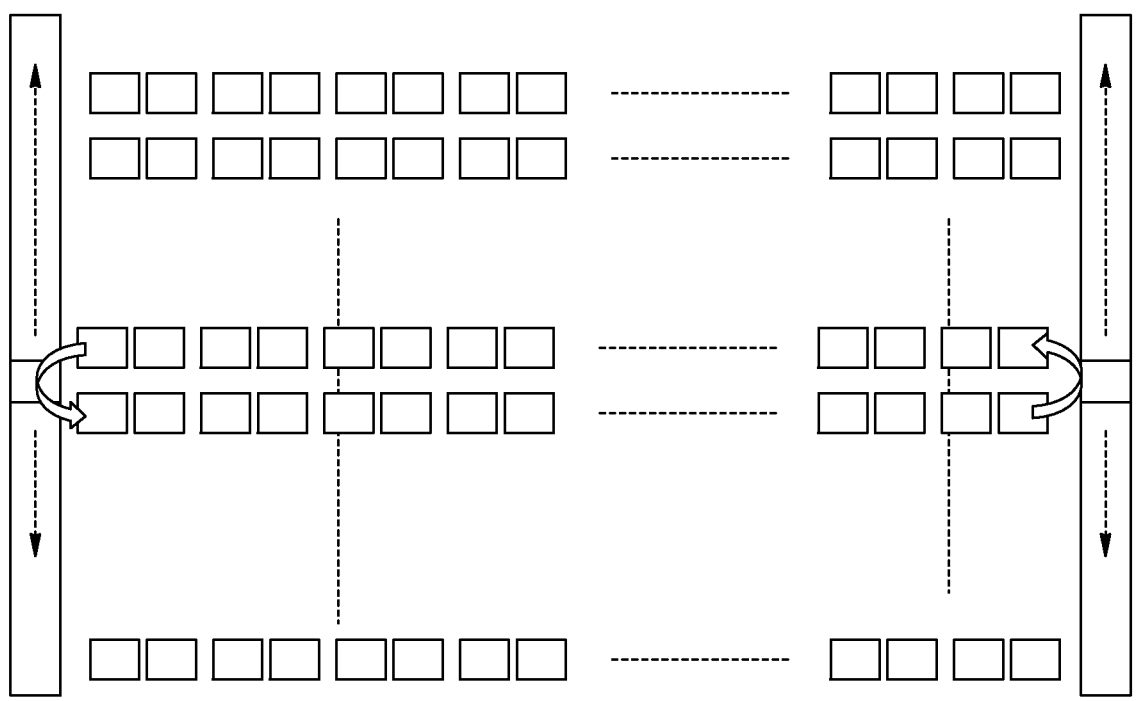
FIG. 31 shows the circular movement of totes between adjacent rows to access totes located on row interiors.

In an embodiment of the single-layer bot configuration, shown in FIG. 30, the carriers work in pairs along the opposite sides of the support structure. The movement of the robotic systems to manipulate the totes is shown in the top view of the support structure shown in FIG. 31. The carriers are able to remove a tote from its source row by decoupling the tote by moving it in a perpendicular horizontal direction to its row and coupling it to an adjacent row in the same motion. Alternatively, as discussed above, the tote may be decoupled from its source row by the passive roller mechanism shown in FIGS. 5A— 5D. The rows are then pushed in opposite directions by the carriers on opposite sides of the storage structure, with the totes at the ends of the rows being uncoupled by the respective carriers and placed into the adjacent row until the desired tote appears at the end of one of the rows. The pushing and pulling of adjacent rows may be bi-directional, depending on which end of a row the target tote is closest. Note that, if a row is fully occupied by totes, it is not necessary that a first carrier pull the row while the second carrier pushes the row.

Figure 32A:
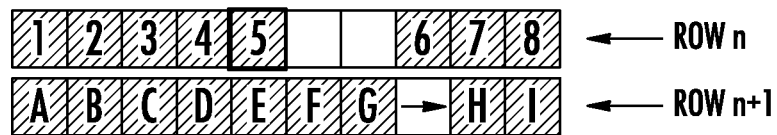
FIGS. 32A-32F are schematic examples of the retrieval of a tote from the interior of a row.
Figure 32B:
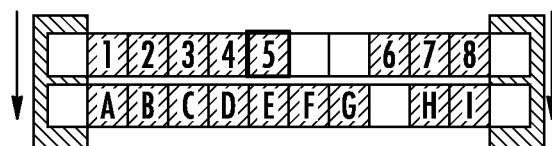
Figure 32C:
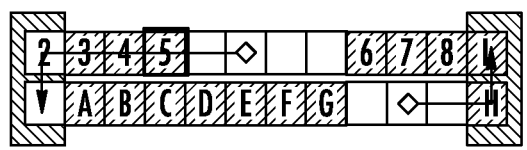
Figure 32D:
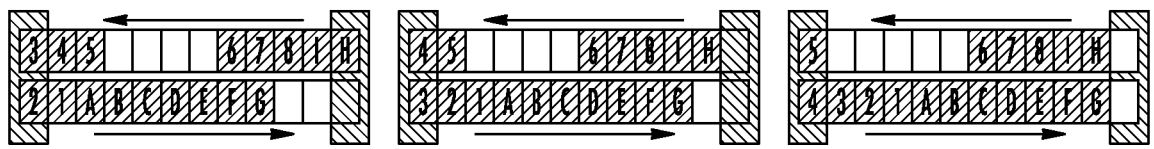
Figure 32E:
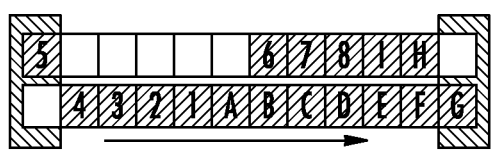
Figure 32F:
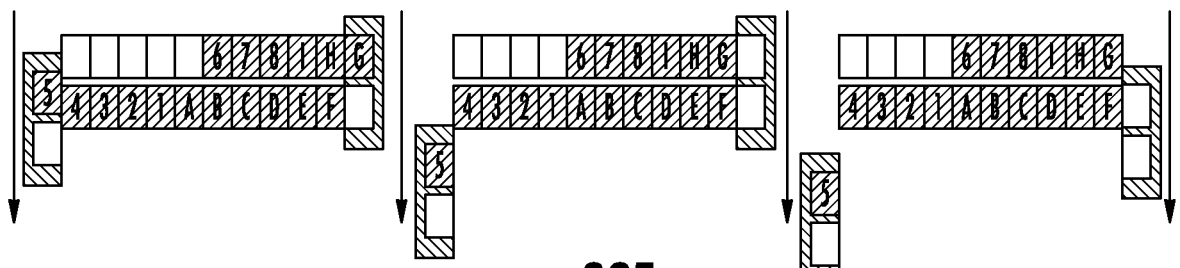

An operational example is shown in FIGS. 32A-32F. In FIG. 32A, tote number 5 is the target tote which is nested in the middle of a two-row pair of totes, denoted as row n and row n+1. Note that there is a gap in both row n and row n+1. In FIG. 32B, a pair of carriers, shown as a left carrier on the left side of the rows and a right carrier on the right side of the rows, is moved to a row containing the target tote as well as an adjacent row. Note that the carriers could also have moved to be positioned on the ends of row n and n−1 (not shown). In FIG. 32C, the left carrier pulls the totes from row n and the right carrier pulls totes from row n+1 to make space for more totes in that row. It should be noted that the right carrier would only need to begin removal of totes from row n+1 after the gap between tote G and tote H has been closed and tote G and tote H are coupled together. In FIG. 32D, the left carrier pushes totes from row n into row n+1, while the right carrier pushes totes from row n+1 into row n until the desired tote (tote 5) is captured by the left carrier. The process could also work in reverse order wherein the totes in row n are pushed to the right, while totes and row n+1 our pushed to the left until the right carrier captures tote 5. In FIG. 32E, the left carrier pushes tote 4 into row n+1 such that tote 5 is the only tote left on the carrier and, in FIG. 32F, the left carrier moves to deliver the tote to the exit point of the system as soon as all other totes are clear. The right carrier may be moved to the next retrieval location. It is not necessary that the left carrier and the right carrier are members of a fixed pair of carriers but may be paired with other carriers as is convenient to optimize storage and retrieval. Note that the described storage and retrieval scheme is useful in both the single-layer bot and multi-layer bot configurations of the storage structure.

The carrier described herein could work individually or in pairs on opposite faces of the structure. When operating on opposite faces of the structures, multiple carriers would work in tandem to push/pull coupled totes linearly along their storage row, and in the perpendicular direction to decouple them from their row, and either place them in another row and push/pull them into that row or retrieve that tote for delivery to the exit point of the system.

Figure 33:
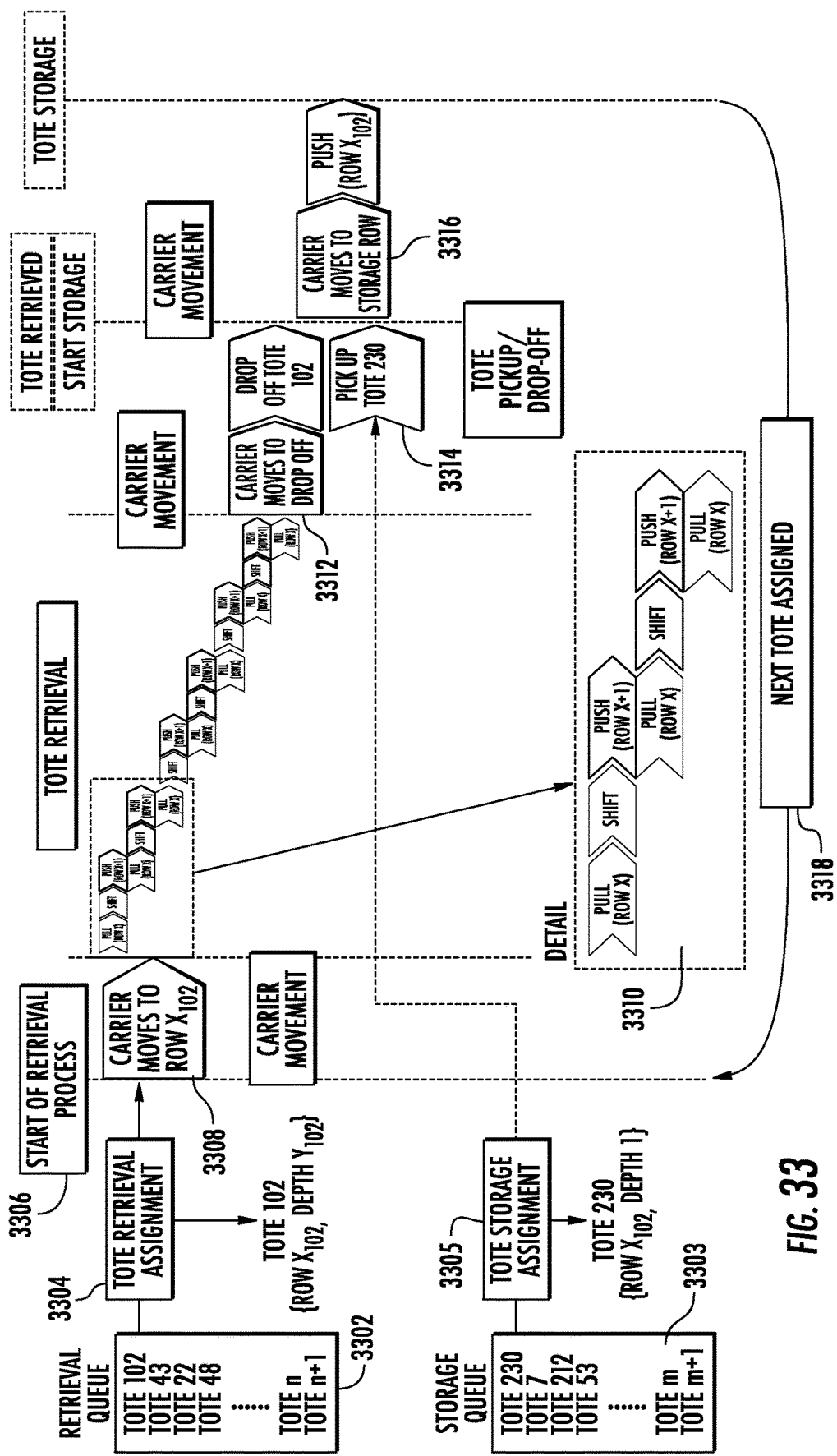
FIG. 33 is a diagrammatic view of the process for storing and retrieving totes.

FIG. 33 is a schematic diagram showing a process for the storage and retrieval of totes. The process utilizes both a retrieval queue 3302 of totes waiting to be retrieved and a storage queue 3303 of totes waiting to be stored. To begin the process, tote is removed from retrieval queue 3302 and, at 3304, the process retrieves the location of the tote. The location of all totes is stored in the database and each location comprises a layer, a row within the layer and a depth within the row. The retrieval process starts at 3306 and, at 3308, the carrier moves to the row containing the tote to be retrieved. The detail of the tote retrieval process is shown in box 3310. The carrier pulls the row containing the desired tote from the storage structure and shifts the first tote in the row, which is now on the carrier, to the adjacent row. The carrier then again pulls the row containing the desired tote, while simultaneously pushing the tote on the carrier into the adjacent row. This process of is repeated until the desired tote is on the carrier, at which point the desired carrier must be decoupled from its row either by active decoupling or by passive decoupling brought about by the carrier shifting the tote perpendicularly with respect to its row, as discussed above. At this point, any other tote on the carrier may be pushed into the adjacent row in the layer, and the carrier will proceed to the exit point of the storage system. In the case of the single-layer bot configuration, the tote will proceed to the end of its home layer, where the desired tote will be pushed onto the ramp leading to the vertical conveyer 2502. In the case of the multi-layer bot configuration, the tote will be transported to the bottom of the storage structure where the tote will be pushed onto the ramp leading to the internal conveyor 1604, as discussed above.

It should be noted that the process may require a carrier on the opposite side of the storage structure acting in tandem with the carrier retrieving the desired tote. As totes are removed from the row containing the desired tote they are shifted to an adjacent row, where they are pushed in and thereby coupled to the adjacent row. If the adjacent row is full, a tote will be pushed out into the opposite side of the storage structure. In this case, a second carrier must be there to retrieve that tote, shift the tote the adjacent row (the row containing the desired tote) and push it into the row. In some embodiments, an electrical or mechanical stop may be provided at the end of the row to prevent a tote from being pushed out of the row until a carrier is present to receive it. The carrier may de-activate the stop, thereby allowing the tote to be pushed out of the row and received by the carrier.

It may not be necessary for the two carriers to arrive at positions on the structure wherein they act in tandem at the same time. For example, if the adjacent row into which totes are pushed after they are retrieved from the row containing the desired tote is not completely full, a tote will not be pushed out of the storage structure on the opposite side until any gap within the row is filled. Therefore, the second carrier may be occupied with other tasks until it is necessary for it to be at the required position to catch totes which are being pushed out of the adjacent row.

Returning to FIG. 33, at 3312 the carrier moves to the drop off point and delivers the retrieved totes to the input/output mechanism. At this point the carrier is able to retrieve a tote from the input/output mechanism to store within the storage structure. The first tote to be stored is removed from queue 3303 and is assigned a storage location at 3305. Again, the storage location must consist of a layer, a row within the layer, and the depth within the row where the tote will be stored. It should be noted that, in most cases, the tote will be stored at the end of a row. At 3316, the carrier moves to the required location and the tote is pushed into the assigned row. At 3318, the next tote is removed from the retrieval queue and the process repeats.

Figure 34A:
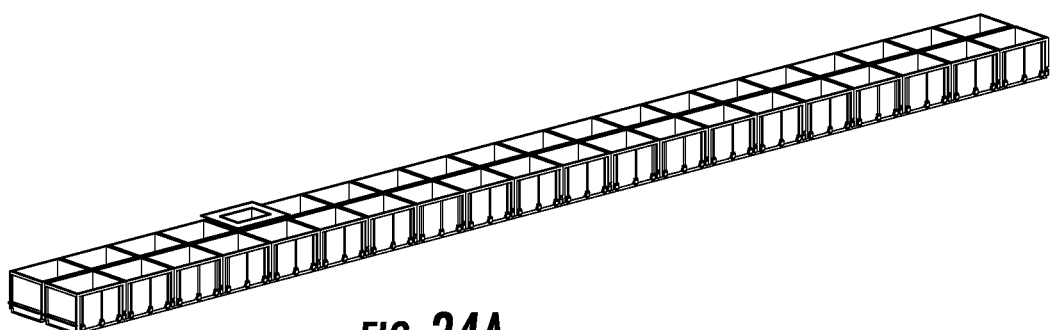
FIGS. 34A-34D show two adjacent rows in a layer showing the movement of totes from one row to another to retrieve a tote in the middle of a row.
Figure 34B:
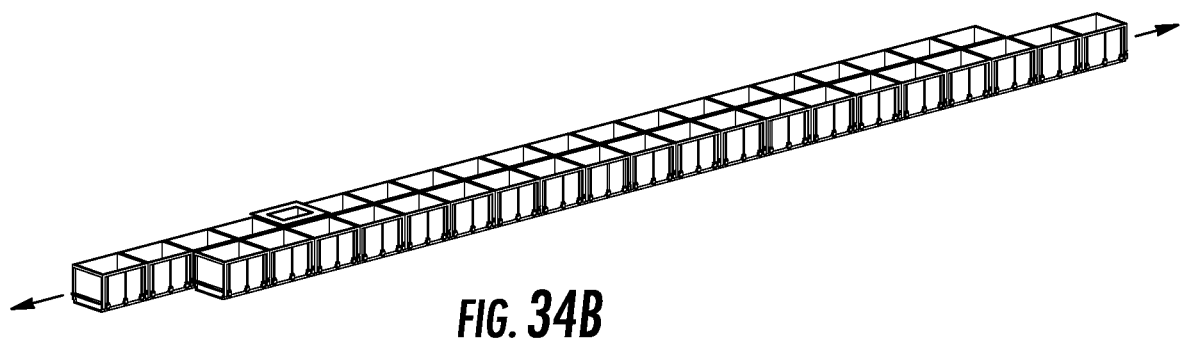
Figure 34C:
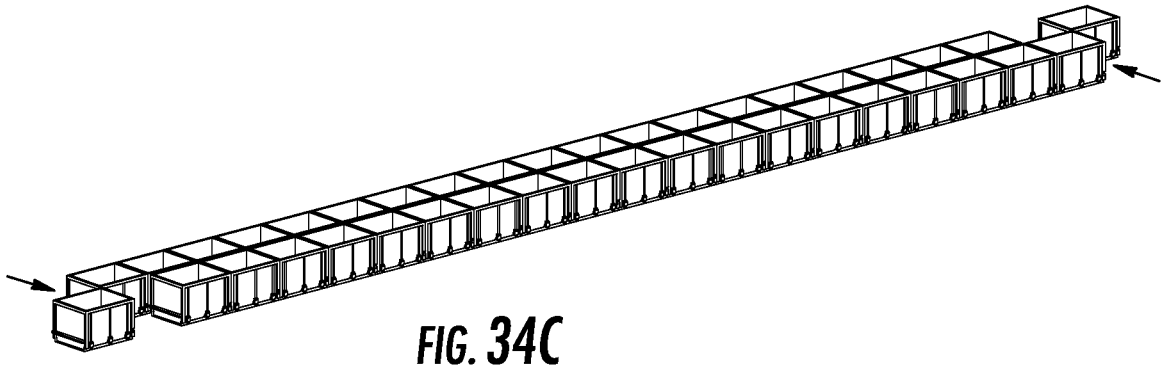
Figure 34D:
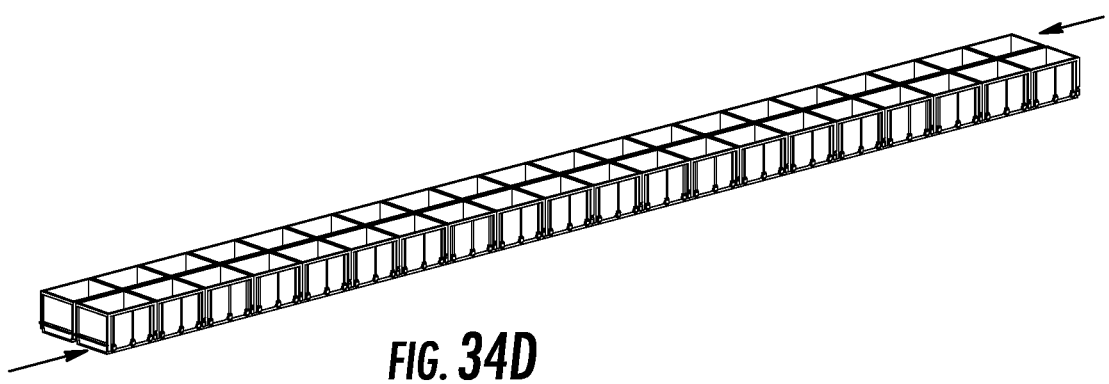

FIGS. 34A-34D show the process of moving a desired tote from the middle of the row to the end of the row where the carrier may pick it up. FIG. 34A shows the desired tote as being at a depth of five within the row. In FIG. 34B, the carriers pull on the ends of the rows, thereby retrieving a tote from opposite sides of the storage structure. In FIG. 34C, the end tote on each row and shifted to the side, which passively decouples it from its row and, in FIG. 34D, the shifted totes are pushed into and coupled with the adjacent rows. In alternate embodiments, only the row containing the desired tote may be pulled and, when the tote is shifted to the adjacent row and pushed into the row, a tote on the opposite side of the row may be pushed out of the storage structure onto the carrier. As such, it may not be necessary for the second carrier on the opposite side of the structure to pull on the row; the second carrier may passively receive totes which are pushed out of the row by the first carrier. The desired tote is now moved one tote closer to the end of the row and the process is repeated until the desired tote is located on the carrier, at which point it is decouple from its row and carried to the exit point of the system.

Figure 35C:
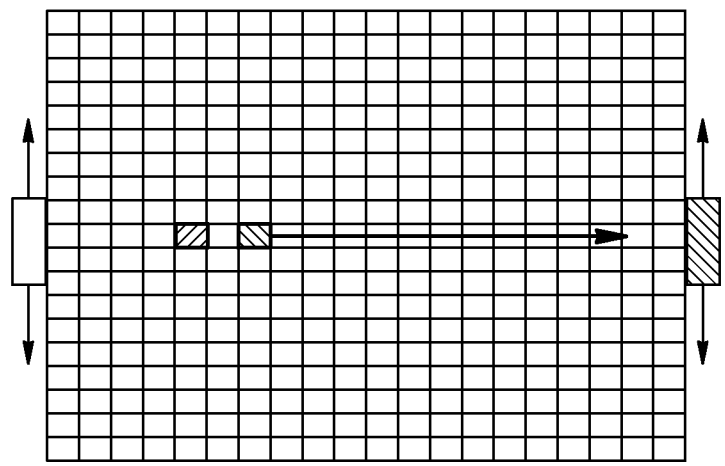
FIGS. 35A-35C show an optimization of the process for retrieving totes.
Figure 35B:
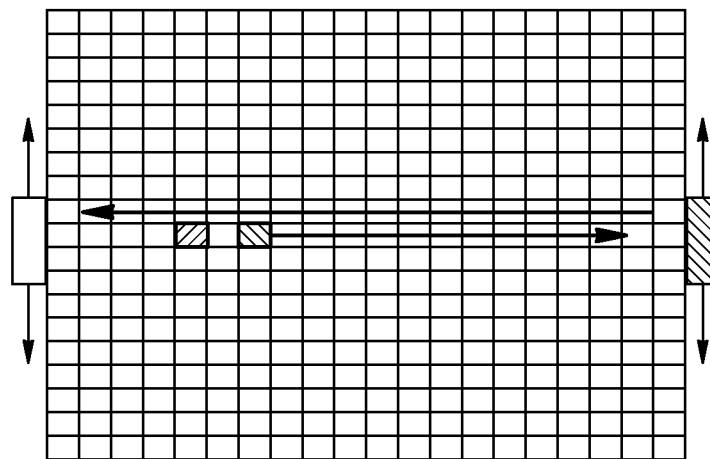
Figure 35A:
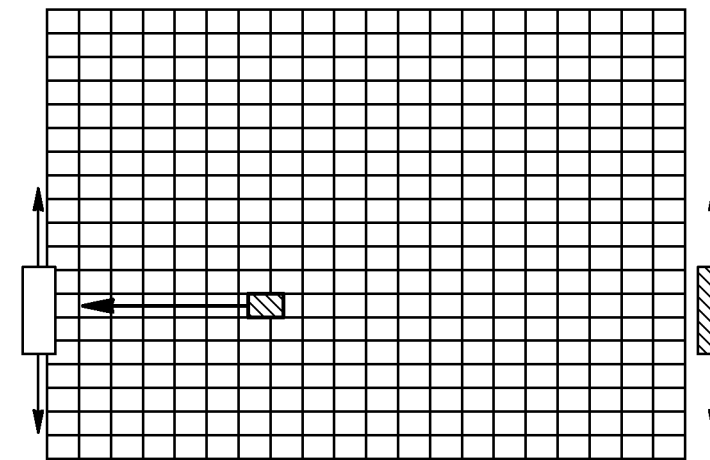

Retrieval Optimizations—There are several optimizations possible which make the storage and retrieval process more efficient. FIGS. 35A-35C show one such optimization. This process defines the direction in which carriers retrieve totes. With carriers on both sides of the storage structure, totes, could be pulled to either carrier for retrieval. The optimized algorithm minimizes the number of push/pull cycles required to move a tote to a carrier. In FIG. 35A, which shows a top view of a horizontal layer of rows, the target tote is closer to the top carrier than the bottom carrier and, as such, top carrier will pull the row and will be able to retrieve the tote using seven pull/shift cycles. FIG. 35B shows a similar case however, there is a gap in the row between the desired tote in the top carrier. As such, even though the desired tote is located physically closer to the top carrier, because the top carrier will not be able to pull the portion of the row containing the desired tote, the row is pulled by the bottom carrier, and will require 13 pull/shift cycles to move the tote to the bottom carrier, as shown in FIG. 35C.

Other optimizations are possible. In one embodiment, when a tote is removed from the storage queue and assigned a storage space, the storage space can be assigned based on location of the next tote in the retrieval queue. The tote to be assigned can be stored in the same position or, alternatively, in the same layer and row as the next tote to be retrieved. When the carriers move to the target row the tote to be stored is pushed into the row while the first tote is pulled. This reduces the movement time of the carriers.

In another embodiment, the queues for storage and retrieval of the totes may be optimized. Instead of retrieving the first tote in the retrieval queue, the estimated retrieval times for all totes in the queue are compared and the tote with the lowest estimated retrieval time may be retrieved first. This is repeated for each retrieval process.

In yet another optimization, carriers may be used in parallel. For a single-layer bot configuration, only one carrier may be used to pick a tote so that other carriers are free to pick other totes or stage picking. This optimization only is useful when the layer is not completely full (i.e., there are rows having a gap in them). For the multi-layer bot configuration parallelization will improve the retrieval rate and will reduce the number of required bots to operate the storage facility.

In a further optimized embodiment, the layout of the totes may be optimized. The totes may be optimized to stocking retrieval sequence to appropriately "buried" unpopular totes deeper in the row and "expose" popular totes to be closer to the edge of the row. The initial and desired layout requires keeping more popular totes in parts of the storage structure that are easy to access, for example, nearer the input/output mechanisms. The system can reconfigure the layout during slow times to prepare for busy times by shuffling popular totes to more easily accessible spots in the storage structure. Note that the popularity of totes can be gauged based on number of times a particular tote is retrieved within a predefined recency.

In yet a further optimized embodiment, a predictive layout optimization may be used to customize the desired layout to optimize for different order popularity based on time of day or week. The layout of the totes within the storage structure can be modified to better suit pickers. The system could account for multiple parallel order fulfillment for pickers and may use machine learning to account for pickers efficiency (and item efficiency) to reduce the amount of required queueing.

Figure 36:
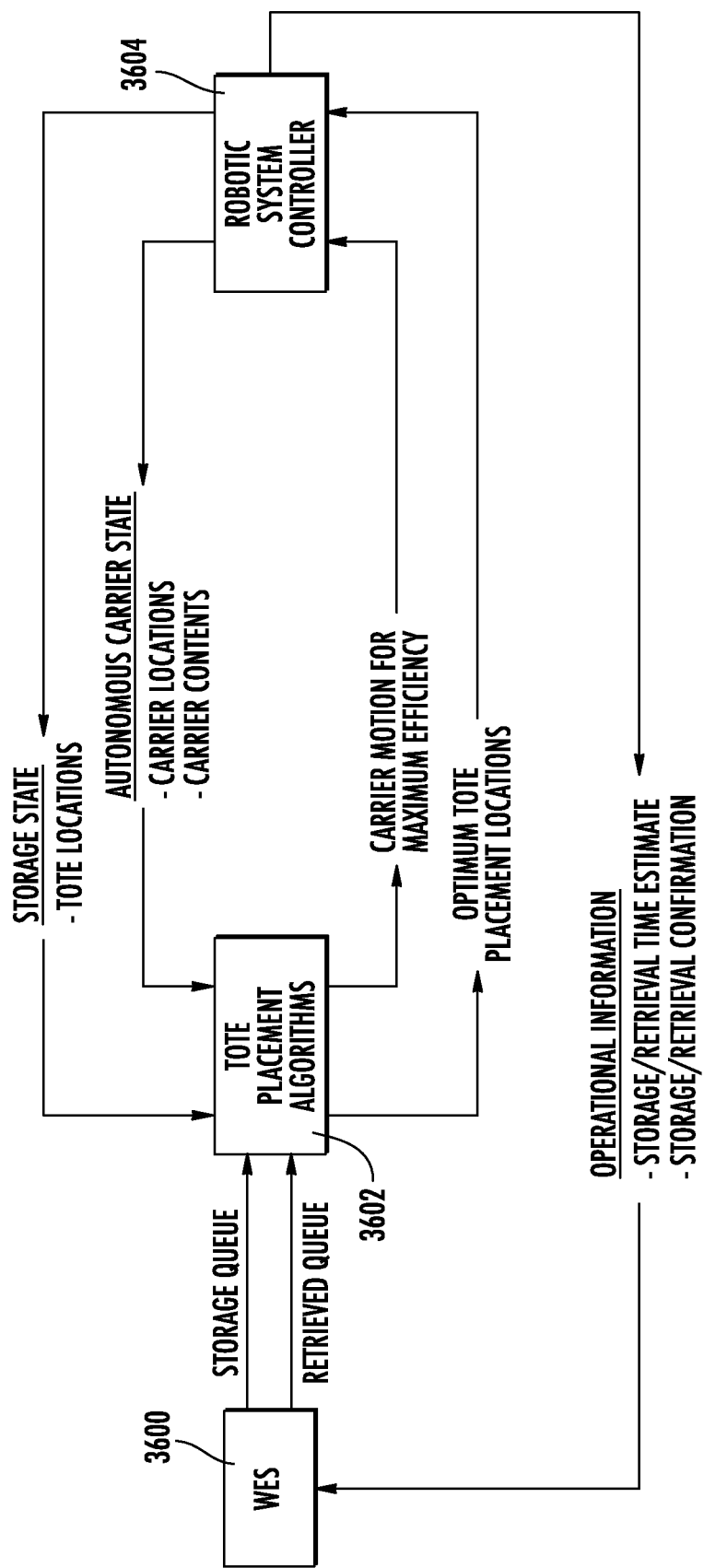
FIG. 36 shows one embodiment of a software architecture of a control system for the described system.

Software Architecture—FIG. 36 shows one implementation of a software architecture to manage and optimize the storage and retrieval processes used to store and retrieve totes within this system. A warehouse execution system (WES) 3600 provides both a desired queue for totes to be stored and a desired queue for totes to be retrieved. Each of these queues are processed into the tote placement algorithms 3602. These algorithms optimize and re-order the queues based on several factors that include, but are not limited to, maximum movement efficiency of the robotic carriers and optimal placemen/storage of totes within the storage structure. Tote placement algorithms 3602 provide the robotic system controller the desired row(s) to place and/or retrieve a tote from. This information is used by the robotic system controller 3604 to determine motion paths and execute the tote storage and retrieval process.

The state of the totes within storage structure is also monitored by the robotic system controller 3604 which updates both the storage state of tote locations and the autonomous carrier state locations and contents back into tote placement algorithms so that it can continue to update carrier motion and tote placement/storage locations for maximum efficiency. Additionally, the robotic system controller 3604 sends operational information back to the WES 3600 to give estimates on storage and retrieval times and confirmation of tote storage and retrieval so that the queues are properly updated.

This software system could include optimizations that include, but are not limited to, deciding which totes should be prioritized for retrieval in the system, the optimal stocking placement for products based on either priority or by how often the product is required to be retrieved from the system, planning for optimal placement of totes being stored in the system, and for how to manage "holes or gaps" in the system that result from a tote being retrieved from the system for other operations. It is important to note that there could only be a single gap on any row.

Figure 37:
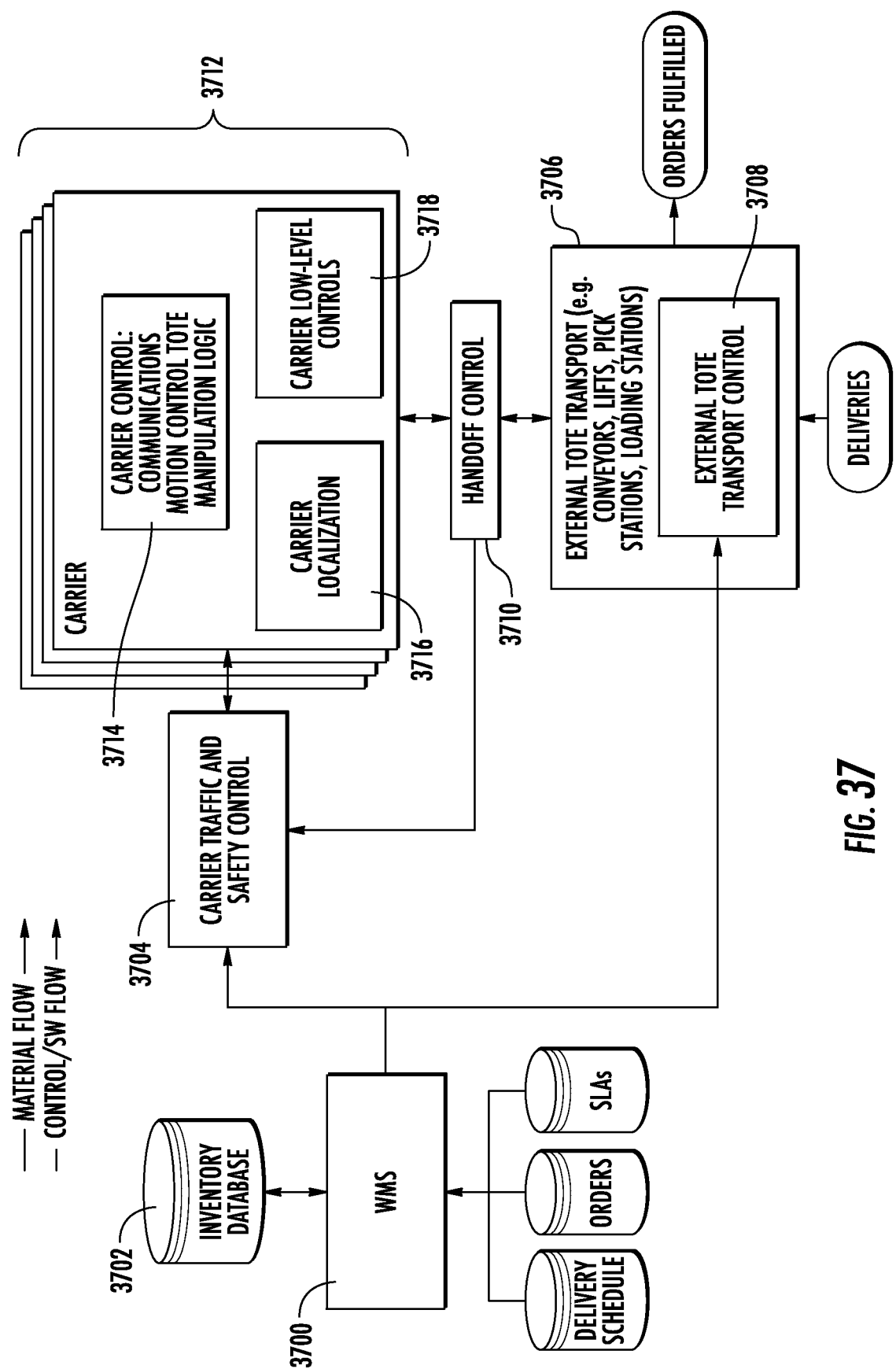
FIG. 37 shows an alternate embodiment of a software architecture of a control system for the described system.

An alternate embodiment of the software architecture is shown in FIG. 37. A warehouse management system (WMS) 3700 monitors and updates a warehouse's inventory database 3702 based on delivery schedules, orders, and service level agreements (SLA)s. The WMS 3700 communicates with carrier traffic and safety controller 3704 for the automated carriers as well as all of the external transport systems for totes (conveyors, lifts, pick stations, loading stations, etc.). The external tote transport 3706 is able to handle the material flow of deliveries coming into the system as well as fulfilled orders going out of the system. The external tote transport control 3708 is able to handoff control of the tote transport to the carrier traffic and safety controller 3704 when totes are flowing into or out of the storage structure. The handoff controller 3710 is able to assign the totes that are being placed or retrieved into the system to a particular set of carriers 3712, each with their own carrier controller 3714 that consists of communications, motion control, and tote manipulation logic controller. As the carrier either stores or retrieves the tote, it continually updates its location via on board localization 3716 and is able to execute desired operations via on on-board low-level controller 3718. As the carriers execute their processes, they communicate with the carrier traffic and safety controller which updates the required trajectories and motions based on the top-level motion requirements for the system.

In preferred embodiments, the hardware components of the system are controlled via software executing on one or more processors. The software may be stored on a non-transitory computer-readable storage medium. In various embodiments of the invention, a process, a system and a non-transitory computer-readable storage medium containing the software may be claimed.

In addition to the components described herein, a means of communicating the instructions to and receiving status from each of the carriers as well as a means of sending instructions to and receiving status from each of the input/output mechanisms will be necessary. These interfaces, in preferred embodiments, will be wireless to avoid the entanglement of wired connections as carriers move about the carrier support structures.

In addition, various embodiments of the invention will require a database to store the current location of each tote stored within the storage system. The locations, in various embodiments, may include a layer indicator indicating the layer in the storage system in which each tote is stored, a row indicator indicating the row within the layer in which each tote is stored, and a depth indicator where within the row each tote is stored.

The software may include various optimization routines which may use information in the database and the current status of the carriers in the input/output mechanisms to optimize movement of the carriers and the order in which the totes are stored and retrieved. In preferred embodiments of the invention, the system may be optimized to obtain the minimum time to retrieve any particular tote from the storage system or, in the alternative, to maximize the number of retrievals per unit time of the system.

In some embodiments of the system, the totes may be provided with a means of identification, for example, an RF tag or a barcode, which may be read by a sensor in the system for confirming the location of a tote as it is moved into or out of the storage system.

In certain embodiments of the system, the totes are unidirectional in nature. That is, the totes must be stored in a certain orientation in the system to enable the coupling of the totes to other totes within each row. As such, the system may be provided with a means for orienting totes such they are oriented in the proper direction before they are stored, or, alternatively, for rejecting totes which are placed into the system in a non-conforming orientation.

The invention has been described in the context of specific embodiments, which are intended only as exemplars of the invention. The many described features of the invention may or may not be present, in any combination, in various embodiments. As would be realized, many variations of the described embodiments are possible. For example, variations in the design, shape, size, location, function, configuration and operation of various components, including both software and hardware components, would still be considered to be within the scope of the invention, which is defined by the following claims.

We claim:

1. A method for arranging and manipulating totes in a storage structure in which a plurality of rows of totes are stored, the method comprising:
   receiving a first tote from a first end of a first row on a first robotic carrier;
   moving the first tote to a first end of a second row; and pushing the first tote into the first end of the second row;
   wherein the second row has a first set of one or more totes at a first end of the second row, a second set of one or more totes at a second end of the second row and a gap between the first and second sets, the gap comprising one or more tote spaces;
   wherein the first tote automatically couples to a tote in the first set at the end of the second row; and
   wherein the gap is reduced by one tote space when the first tote is pushed into the first end of the second row.

2. The method of claim 1 wherein the gap is one tote space and further wherein the first set of totes is automatically coupled to the second set of totes when the first tote is pushed into the first end of the second row.

3. The method of claim 1 wherein moving the first tote to a first end of a second row comprises:
   moving the first tote from a first position on the first robotic carrier to a second position on the first robotic carrier; or
   moving the first robotic carrier in a direction orthogonal to a longitudinal axis of the first row.

4. The method of claim 3 wherein moving the first tote to a first end of a second row comprises:
   moving the first tote in a direction orthogonal to a longitudinal axis of the first row;
   wherein moving the first tote in the orthogonal direction automatically decouples the first tote from the other totes in the first row.

5. A method for arranging and manipulating totes in a storage structure in which a plurality of rows of totes are stored, the method comprising:
   receiving a first tote from a first end of a first row on a first robotic carrier;
   moving the first tote to a first end of a second row; and pushing the first tote into the first end of the second row;
   wherein the second row has a set of one or more totes at a second end of the second row and a gap of one or more tote spaces at the first end of the second row;

wherein the gap is reduced by one tote space when the first tote is pushed into the first end of the second row.

6. The method of claim 5 wherein the gap is one tote space and further wherein the first tote is automatically coupled to the set of totes when the first tote is pushed into the first end of the second row.

7. The method of claim 5 wherein moving the first tote to a first end of a second row comprises:
   moving the first tote from a first position on the first robotic carrier to a second position on the first robotic carrier; or
   moving the first robotic carrier in a direction orthogonal to a longitudinal axis of the first row.

8. The method of claim 7 wherein moving the first tote to a first end of a second row comprises:
   moving the first tote in a direction orthogonal to a longitudinal axis of the first row;
   wherein moving the first tote in the orthogonal direction automatically decouples the first tote from the other totes in the first row.

9. A method for arranging and manipulating totes in a storage structure in which a plurality of rows of totes are stored, the method comprising:
   receiving a first tote from a first end of a first row on a first robotic carrier;
   moving the first tote to a first end of a second row; and
   pushing the first tote into the first end of the second row;
   wherein the second row has a set of one or more totes at the first end of the second row and a gap of one or more tote spaces at the second end of the second row;
   wherein the first tote is automatically coupled to the set of totes when the first tote is pushed into the first end of the second row; and
   wherein the gap is reduced by one tote space when the first tote is pushed into the first end of the second row.

10. The method of claim 9 wherein moving the first tote to a first end of a second row comprises:
    moving the first tote from a first position on the first robotic carrier to a second position on the first robotic carrier; or
    moving the first robotic carrier in a direction orthogonal to a longitudinal axis of the first row.

11. The method of claim 10 wherein moving the first tote to a first end of a second row comprises:
    moving the first tote in a direction orthogonal to a longitudinal axis of the first row;
    wherein moving the first tote in the orthogonal direction automatically decouples the first tote from the other totes in the first row.

* * * * *